United States Patent
Marukame et al.

(10) Patent No.: US 12,093,809 B2
(45) Date of Patent: Sep. 17, 2024

(54) ARITHMETIC DEVICE AND NEURAL NETWORK DEVICE

(71) Applicant: KABUSHIKI KAISHA TOSHIBA, Tokyo (JP)

(72) Inventors: Takao Marukame, Chuo Tokyo (JP); Koichi Mizushima, Kamakura Kanagawa (JP); Kumiko Nomura, Shinagawa Tokyo (JP); Yoshifumi Nishi, Yokohama Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 878 days.

(21) Appl. No.: 17/184,432

(22) Filed: Feb. 24, 2021

(65) Prior Publication Data
US 2022/0083845 A1    Mar. 17, 2022

(30) Foreign Application Priority Data
Sep. 16, 2020    (JP) .................................. 2020-155625

(51) Int. Cl.
*G06N 3/063* (2023.01)
*G06F 7/50* (2006.01)
(Continued)

(52) U.S. Cl.
CPC ............... *G06N 3/063* (2013.01); *G06F 7/50* (2013.01); *G06F 7/523* (2013.01); *G06F 7/5443* (2013.01); *G06F 2207/4812* (2013.01)

(58) Field of Classification Search
CPC .......... G06F 7/50; G06F 7/523; G06F 7/5443; G06N 3/063
See application file for complete search history.

(56) References Cited

U.S. PATENT DOCUMENTS

| | | | | |
|---|---|---|---|---|
| 5,588,090 A | * | 12/1996 | Furuta | ................... G06N 3/063 706/35 |
| 10,175,947 B1 | | 1/2019 | Marukame et al. | |

(Continued)

FOREIGN PATENT DOCUMENTS

| | | |
|---|---|---|
| JP | 2018-120433 A | 8/2018 |
| JP | 2019-53563 A | 4/2019 |

(Continued)

*Primary Examiner* — Michael D. Yaary
(74) *Attorney, Agent, or Firm* — Finnegan, Henderson, Farabow, Garrett & Dunner, LLP

(57) ABSTRACT

An arithmetic device includes N product-sum-operation circuits, a control circuit, and an output circuit. Each product-sum-operation circuit outputs intermediate signals obtained by binarizing a product-sum-operation value obtained by product-sum-operation of M input values of M input signals and M weight values. The control circuit inverts positive/negative of each M weight value at determining-timing when a given time elapses from input timing. Based on a delay time from the determination-timing to logic finalization of the intermediate signal for each N product-sum-operation circuit, the output circuit outputs an output signal representing a winner-product-sum-operation circuit for which the product-sum-operation value having a sign and the largest absolute value is calculated. Each N product-sum-operation circuit starts the product-sum-operation from the input-timing and the determination-timing, and outputs an intermediate signal for which a propagation-delay-time from starting of the product-sum-operation to inversion of the logic corresponds to the absolute value of the product-sum-operation value.

18 Claims, 13 Drawing Sheets

(51) Int. Cl.
   *G06F 7/523*     (2006.01)
   *G06F 7/544*     (2006.01)

(56) References Cited

U.S. PATENT DOCUMENTS

| | | |
|---|---|---|
| 2015/0339570 A1* | 11/2015 | Scheffler ............ G06N 3/04 706/27 |
| 2018/0211154 A1 | 7/2018 | Mori et al. |
| 2019/0156181 A1 | 5/2019 | Marukame et al. |
| 2020/0026496 A1 | 1/2020 | Marukame et al. |
| 2020/0034695 A1 | 1/2020 | Marukame et al. |
| 2020/0293861 A1 | 9/2020 | Marukame et al. |
| 2020/0302274 A1 | 9/2020 | Marukame et al. |
| 2020/0302275 A1 | 9/2020 | Nomura et al. |
| 2020/0379733 A1 | 12/2020 | Berdan et al. |
| 2020/0380347 A1 | 12/2020 | Marukame et al. |
| 2021/0056383 A1 | 2/2021 | Nishi et al. |
| 2021/0081771 A1 | 3/2021 | Marukame et al. |
| 2021/0216282 A1 | 7/2021 | Marukame et al. |

FOREIGN PATENT DOCUMENTS

| | | |
|---|---|---|
| JP | 2019-95860 A | 6/2019 |
| JP | 2020-13398 A | 1/2020 |
| JP | 2020-17114 A | 1/2020 |
| JP | 2020-149625 A | 9/2020 |
| JP | 2020-197761 A | 12/2020 |
| JP | 2020-197922 A | 12/2020 |
| JP | 2021-33415 A | 3/2021 |
| JP | 2021-47503 A | 3/2021 |
| JP | 2021-111142 A | 8/2021 |

* cited by examiner

FIG.8

| INPUT (x) | | BINARIZED VALUE OF PRODUCT-SUM OPERATION VALUE (y) OUTPUT VALUE | | | | | | | | WINNER ↓ | | | | | |
|---|---|---|---|---|---|---|---|---|---|---|---|---|---|---|---|
| | | 0 | 0 | 0 | 0 | 0 | 0 | 0 | 0 | 0 | 1 | 0 | 0 | 0 | 0 | 0 |
| | | -1 | -1 | -1 | -1 | -1 | -1 | -1 | -1 | -1 | 1 | -1 | -1 | -1 | -1 | -1 |
| | PRODUCT-SUM OPERATION VALUE (μ) | 4 | 8 | 12 | 0 | -8 | -8 | 4 | 2 | -4 | 16 | 2 | 0 | -2 | 8 | 0 | -16 |
| | | A | C | D | F | H | I | J | L | N | O | P | R | T | U | V | X |

WEIGHT MATRIX (w)

ARITHMETIC DEVICE AND NEURAL NETWORK DEVICE

CROSS-REFERENCE TO RELATED APPLICATIONS

This application is based upon and claims the benefit of priority from Japanese Patent Application No. 2020-155625, filed on Sep. 16, 2020; the entire contents of which are incorporated herein by reference.

FIELD

Embodiments described herein relate generally to an arithmetic device and a neural network device.

BACKGROUND

In recent years, a neural network device implemented by hardware has been studied. Each of units included in a neural network device implemented by hardware executes a product-sum operation (multiply-accumulation) by an electric circuit. That is, the unit implemented by the electric circuit multiplies each of the plurality of input signals received from the unit in the previous stage by a weight, and adds the plurality of input signals after the weights are multiplied.

For example, a neural network device including a product-sum operation circuit using a current source, a resistor, and a comparator is known. The comparator outputs a comparison result of comparing the magnitude between the voltage of the positive-side signal and the voltage of the negative-side signal as a firing signal. The difference between the voltage of the positive-side signal and the voltage of the negative-side signal is a value according to the product-sum operation value.

Meanwhile, in the electric circuit that executes the product-sum operation, there are cases where the response speed changes depending on the absolute value of the product-sum operation value. For example, in a product-sum operation circuit that uses a current source, a resistor, and a comparator, the response is delayed when the absolute value of the product-sum operation value is small, compared to when the absolute value of the product-sum operation value is large, due to the characteristics of the comparator. Therefore, in a neural network device implemented by hardware, for example, a product-sum operation circuit other than the target product-sum operation circuit might fire with a delay in some cases.

As such, the neural network device implemented by hardware necessitates more time in learning so as to fire the target product-sum operation circuit only and not to fire the other product-sum operation circuits. However, spending long period of time in learning would increase learning cost for the neural network device.

BRIEF DESCRIPTION OF THE DRAWINGS

FIG. 8 is a diagram illustrating processes in a layer circuit;

DETAILED DESCRIPTION

An arithmetic device according to an embodiment includes N product-sum operation circuits, a control circuit, and an output circuit. Each of the N product-sum operation circuits receives inputting of M common input signals. Each of the N product-sum operation circuits is set with M weight values and outputs an intermediate signal obtained by binarizing a product-sum operation value calculated by product-sum operation of M input values and the M weight values, where M is an integer of 2 or more and N is an integer of 2 or more, and the M input values is represented by the M input signals.

With respect to the N product-sum operation circuits, the control circuit inverts positive/negative of each of the M input values or positive/negative of each of the M weight values set to each of the N product-sum operation circuits, at a determination timing being a timing when a given time elapses from an input timing at which the M input values have been input to the each of the N product-sum operation circuits. The output circuit outputs an output signal representing a winner product-sum operation circuit for which the product-sum operation value having a given sign and a largest absolute value is calculated among the N product-sum operation circuits, based on a delay time from the determination timing to finalization of a logic of the intermediate signal of each of the N product-sum operation circuits. Each of the N product-sum operation circuits starts a product-sum operation individually from the input timing and from the determination timing. Additionally, each of the N product-sum operation circuits outputs the intermediate signal for which a propagation delay time from the start of the product-sum operation until the finalization of the logic corresponds to the absolute value of the product-sum operation value.

The embodiments herein provide an arithmetic device and a neural network device capable of accurately generate an output signal indicating a product-sum operation circuit for which a product-sum operation value having a given sign and the largest absolute value is calculated, and capable of reducing the learning time. Hereinafter, a neural network device 10 according to an embodiment will be described with reference to the drawings.

Figure 1:
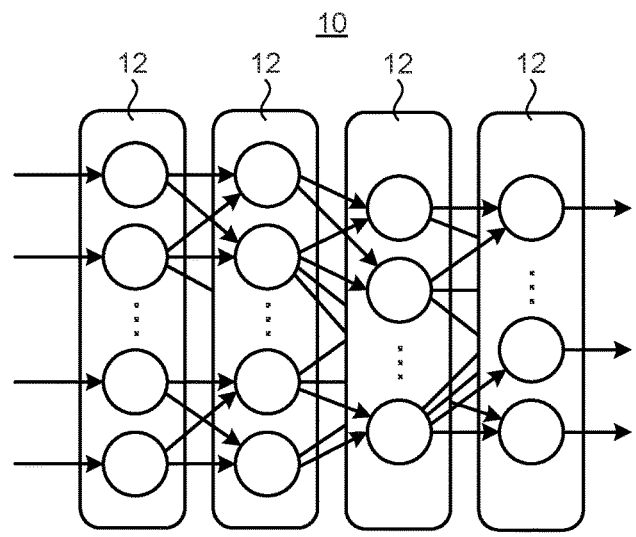
FIG. 1 is a diagram illustrating a configuration of a neural network device according to an embodiment.

FIG. 1 is a diagram illustrating a configuration of the neural network device 10 according to an embodiment. The neural network device 10 includes one or more layer circuits 12. The layer circuit 12 in the input stage receives a signal from the outside, executes an arithmetic operation on the received signal, and supplies the signal to the layer circuit 12 in the subsequent stage. The intermediate layer circuit 12 receives the signal output from the layer circuit 12 in the previous stage, executes an arithmetic operation on the received signal, and supplies the signal to the layer circuit 12 in the subsequent stage. The layer circuit 12 in the output stage receives a signal from the layer circuit 12 in the previous stage, executes arithmetic processing, and outputs the arithmetic result to the outside.

Figure 2:
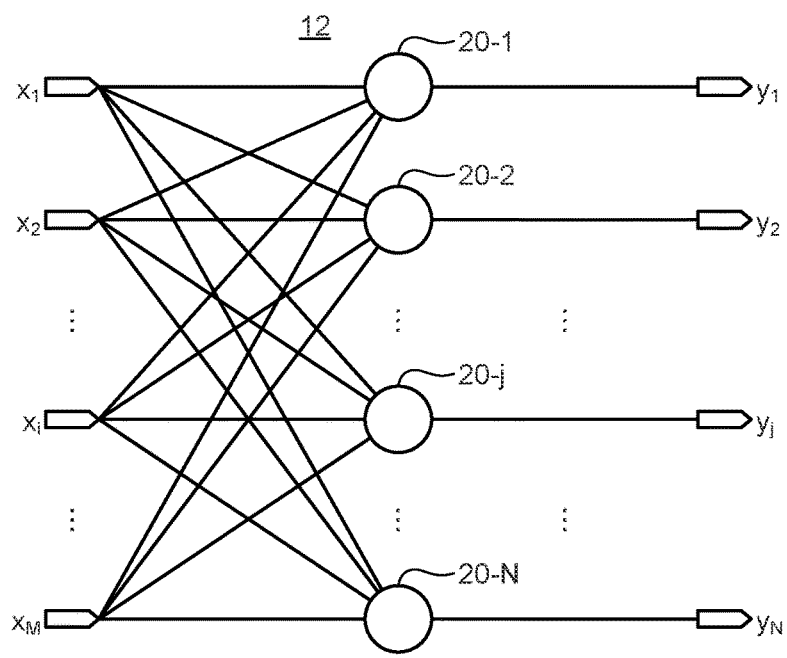
FIG. 2 is diagram illustrating one layer circuit of a neural network device.
Figure 3:
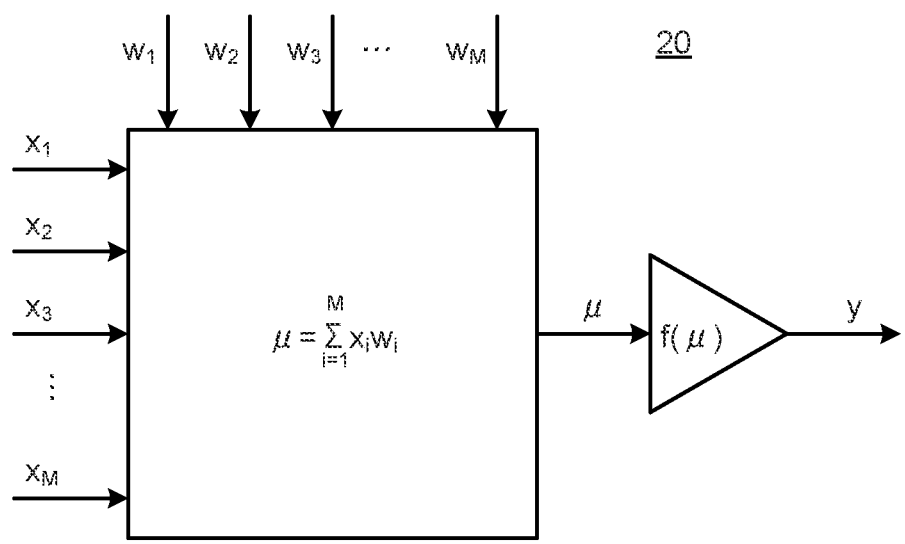
FIG. 3 is a diagram illustrating a product-sum operation performed by a product-sum operation circuit.

FIG. 2 is a diagram illustrating one layer circuit 12 provided in the neural network device 10. Each of the plurality of layer circuits 12 includes N product-sum operation circuits 20 (20-1 to 20-N) corresponding to N intermediate signals ($y_1$ to $y_N$) (N is an integer of 2 or more). The j-th product-sum operation circuit 20-j of the N product-sum operation circuits 20 (j is an arbitrary integer from 1 to N) corresponds to the j-th intermediate signal ($y_j$). Furthermore, each of the N product-sum operation circuits 20 receives a common M input signals ($x_1$ to $x_M$). FIG. 3 is a diagram illustrating a product-sum operation by the product-sum operation circuit 20. Each of the M input signals ($x_1$ to $x_M$) represents an input value.

Furthermore, each of the N product-sum operation circuits 20 has settings of M weight values ($w_{1j}$, $w_{2j}$, . . . , $w_{ij}$, . . . , $w_{Mj}$) corresponding to M input signals. The M weight values set in each of the N product-sum operation circuits 20 are unique to each product-sum operation circuit 20.

Each of the N product-sum operation circuits 20 performs a product-sum operation on the M input values represented by the M input signals and the set M weight values. Each of the N product-sum operation circuits 20 outputs intermediate signals ($y_1$ to $y_N$) representing a value obtained by binarizing the product-sum operation value obtained by performing the product-sum operation of M input values and M weight values. For example, the product-sum operation circuit 20-j corresponding to the j-th intermediate signal executes an arithmetic operation of the following Formula (1).

$$y_j = f\left(\sum_{i=1}^{M} x_i w_{ij}\right) \quad (1)$$

In Formula (1), y is the value represented by the j-th intermediate signal. $x_i$ is an input value represented by the i-th input signal (i is an integer of 1 or more and M or less). $w_{ij}$ is the weight value to be multiplied by the i-th input signal of the M weight values. In Formula (1), f(X) represents a function that binarizes the value X in parentheses with a given threshold. The N product-sum operation circuit 20 executes the above operation by, for example, an electric circuit including an analog circuit.

In the present embodiment, each of the M input values is either −1 or +1. Furthermore, in the present embodiment, each of the M weight values is either −1 or +1.

Note that at least one of the M input values and the M weight values is M values including a positive or negative sign. The other of the M input values and the M weight values may be a value that does not include a positive or negative sign. For example, when each of the M weight values is −1 or +1 then each of the M input values may be either 0 or 1. Furthermore, when at least one of the M input values and the M weight values are M values including positive or negative signs, each of the M input values and each of the M weight values may be a multi-value. For example, each of the M weight values may be an 8-bit value ranging −128 to +128.

Figure 4:
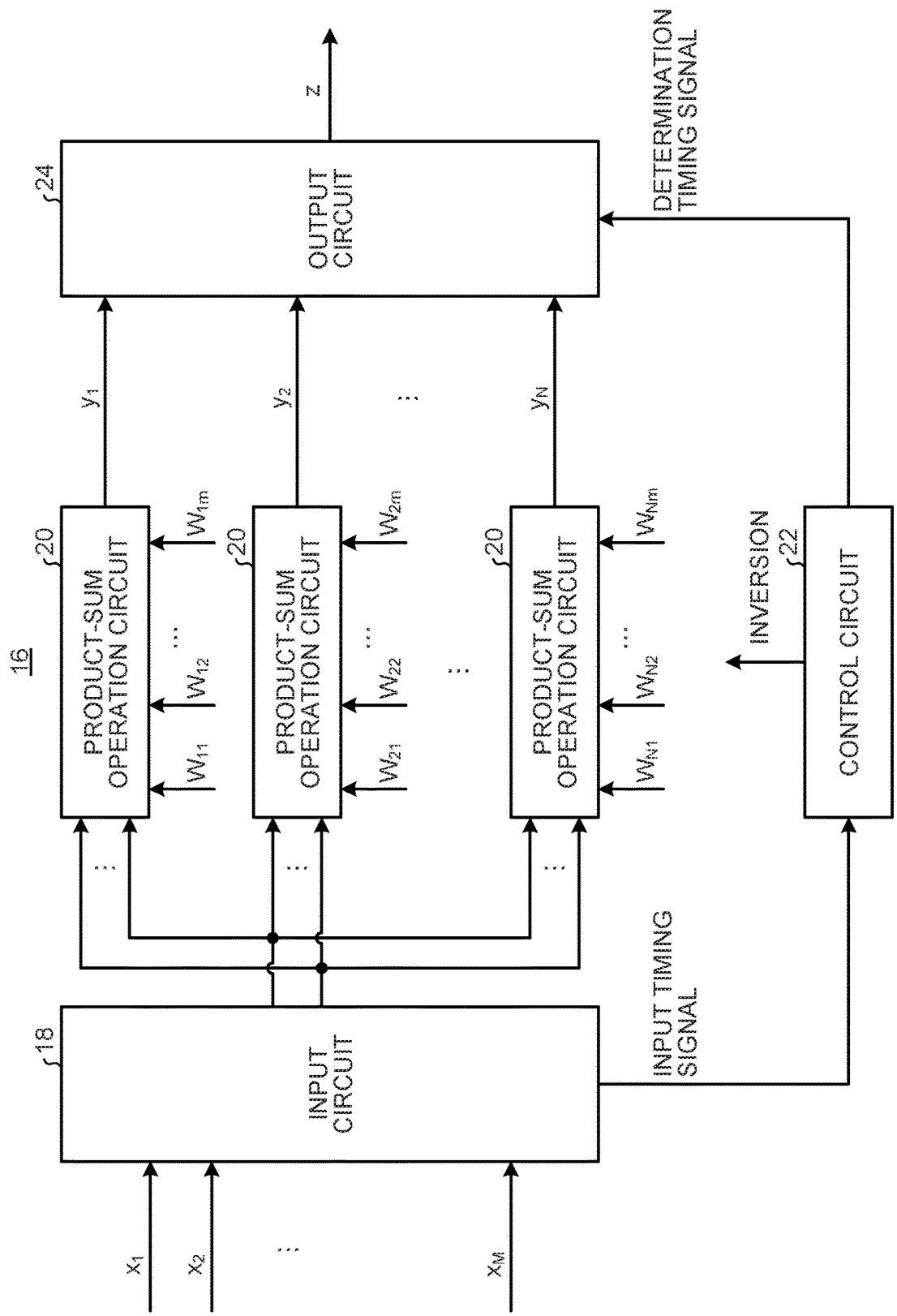
FIG. 4 is a diagram illustrating a configuration of an arithmetic device included in a layer circuit.

FIG. 4 is a diagram illustrating a configuration of an arithmetic device 16 included in the layer circuit 12 of the output stage. The layer circuit 12 of the output stage includes an arithmetic device 16 as illustrated in FIG. 4. The arithmetic device 16 may be included in the layer circuit 12 other than the layer circuit 12 of the output stage.

The arithmetic device 16 includes an input circuit 18, N product-sum operation circuits 20, a control circuit 22, and an output circuit 24.

The input circuit 18 receives M input signals ($x_1$ to $x_M$) and supplies M input signals to each of the N product-sum operation circuits 20. Furthermore, the input circuit 18 detects the input timings of the M input values represented by the M input signals, and supplies the input timing signals indicating the input timings to the control circuit 22. For example, the input circuit 18 detects the timing at which the value of at least one of the M input signals has changed as an input timing.

The N product-sum operation circuit 20 has inputting of M common input signals from the input circuit 18. Each of the N product-sum operation circuits 20 has settings of M weight values ($w_{ij}$, $w_{2j}$, . . . , $w_{ij}$, . . . , $w_{Mj}$). Each of the N product-sum operation circuits 20 outputs intermediate signals ($y_1$ to $y_M$) obtained by binarizing the product-sum operation value obtained by performing the product-sum operation of M input values represented by M input signals, and M weight values. Each of the N product-sum operation circuits 20 supplies the intermediate signal to the output circuit 24.

The control circuit 22 receives from the input circuit 18 an input timing signal representing an input timing at which M input values are input. At a determination timing when a given time has elapsed from the input timing, the control circuit 22 inverts the positive/negative of each of the M input values or the M weight values set in each of the N product-sum operation circuits 20. Furthermore, the control circuit 22 supplies a determination timing signal indicating the determination timing to the output circuit 24 at the determination timing.

At least either one of the M input values and the M weight values includes positive/negative signs. In the case of the control circuit 22, the control circuit 22 inverts, for either one of the M input (signals) values and the M weight values, the positive/negative of each of the M values of the one including the positive/negative signs at the determination timing. In the present embodiment, the control circuit 22 inverts the positive/negative of each of the M weight values at the determination timing.

The output circuit 24 receives inputting of intermediate signal from each of the N product-sum operation circuits 20. Furthermore, the output circuit 24 is supplied with a determination timing signal from the control circuit 22. The output circuit 24 detects a delay time from the determination timing to the finalization of the logic of the intermediate signal for each of the N product-sum operation circuits 20. In the present embodiment, the output circuit 24 detects the inversion delay time from the determination timing to the inversion of the logic of the intermediate signal for each of the N product-sum operation circuits 20. Furthermore, based on the inversion delay time of each of the N product-sum operation circuits 20, the output circuit 24 determines a winner product-sum operation circuit for which the product-sum operation value having a given sign and the largest absolute value is calculated among the N product-sum operation circuits 20. Subsequently, the output circuit 24 outputs an output signal (z) representing the determined winner product-sum operation circuit.

For example, among the N product-sum operation circuits 20, the output circuit 24 determines the product-sum operation circuit 20 that outputs an intermediate signal for which the sign of the calculated product-sum operation value is a given sign and the inversion delay time is the shortest, as the winner product-sum operation circuit. For example, among the N product-sum operation circuits 20, the output circuit 24 determines the product-sum operation circuit 20 that outputs an intermediate signal for which the sign becomes a given sign after the input timing and the inversion delay time is the shortest, as the winner product-sum operation circuit.

Here, each of the N product-sum operation circuits 20 starts the product-sum operation individually from the input timing and from the determination timing. Furthermore, each of the N product-sum operation circuits 20 outputs an intermediate signal for which the delay time from the start of the product-sum operation to the finalization of the logic corresponds to the absolute value of the product-sum operation value. In the present embodiment, each of the N product-sum operation circuits 20 outputs the intermediate signal for which, the larger the absolute value of the product-sum operation value, the shorter the propagation delay time from the start of the product-sum operation to the inversion of the logic. Therefore, by detecting the delay time from the determination timing to the finalization of the logic of the intermediate signal for each of the N product-sum operation circuits 20, the output circuit 24 can determine the winner product-sum operation circuit for which the product-sum operation value having a given sign and the largest absolute value is calculated. In the present embodiment, by detecting the product-sum operation circuit 20 that outputs an intermediate signal for which the sign becomes a given sign after the input timing and the inversion delay time is the shortest among the N product-sum operation circuits 20, the output circuit 24 can determine the winner product-sum operation circuit for which the product-sum operation value having the given sign and the largest absolute value is calculated, from among the N product-sum operation circuits 20.

The control circuit 22 may repeatedly set the determination timing a plurality of times at given intervals after the timing at which a given time has elapsed from the input timing. At each of the determination timings, the control circuit 22 inverts the positive/negative of each of the M input values or the M weight values set in each of the N product-sum operation circuits 20. Furthermore, the control circuit 22 supplies the determination timing signal to the output circuit 24 at each of the determination timings.

In this case, the output circuit 24 detects the inversion delay time from each of the determination timings for each of the N product-sum operation circuits 20. Subsequently, based on a plurality of inversion delay times detected for each of the N product-sum operation circuits 20, the output circuit 24 determines the winner product-sum operation circuit among the N product-sum operation circuits 20.

For example, the output circuit 24 calculates an average value of the plurality of inversion delay times for each of the N product-sum operation circuits 20. Subsequently, the output circuit 24 determines the product-sum operation circuit 20 for which the sign of the product-sum operation value is a given sign and the average value of the plurality of inversion delay times is the smallest among the N product-sum operation circuits 20, as the winner product-sum operation circuit. Furthermore, for example, the output circuit 24 determines the product-sum operation circuit 20 that outputs an intermediate signal for which the sign becomes the given sign after the input timing, which is the product-sum operation circuit 20 having the smallest average of a plurality of inversion delay times, among the N product-sum operation circuits 20, as the winner product-sum operation circuit. Even with processing in this manner, the output circuit 24 can determine the winner product-sum operation circuit for which the product-sum operation value having a given sign and the largest absolute value is calculated, from among the N product-sum operation circuits 20.

Furthermore, the arithmetic device 16 may further include a storage circuit that stores set M weight values corresponding to each of the N product-sum operation circuits 20. In this case, the storage circuit stores M weight values set in the corresponding product-sum operation circuit 20 and M inverted values obtained by inverting the positive/negative of each of the M weight values. Subsequently, at the determination timing, the control circuit 22 switches the M values output from the storage circuit so as to be switched from the M weight values to the M inverted values, or switched from the M inverted values to the M weight values. With this operation, the arithmetic device 16 can easily and quickly switch from M weight values to M inverted values or from M inverted values to M weight values at the determination timing.

Furthermore, in this case, the storage circuit may include M positive cells corresponding to M weight values and M inverted cells corresponding to M inverted values. In addition, each of the M positive cells and each of the M inverted cells may have a memristor set to a resistance value according to the corresponding weight value or inverted value. This enables the arithmetic device 16 to easily store the resistance value according to the weight value or the inverted value.

Furthermore, the arithmetic device 16 may further include an input inverting circuit that switches between M input values and M inverted input values obtained by inverting the positive/negative of each of the M input values, for the N product-sum operation circuit 20. For example, an input inverting circuit is provided to be shared with N product-sum operation circuits 20. Then, the control circuit 22 controls the input inverting circuit at the determination timing to switch the M values to be supplied to the N product-sum operation circuits 20 from the M input values to the M inverted input values or from M inverted input values to M input values. With this operation, the arithmetic device 16 can easily switch from M input values to M inverted input values or from M inverted input values to M input values at the determination timing.

Figure 5:
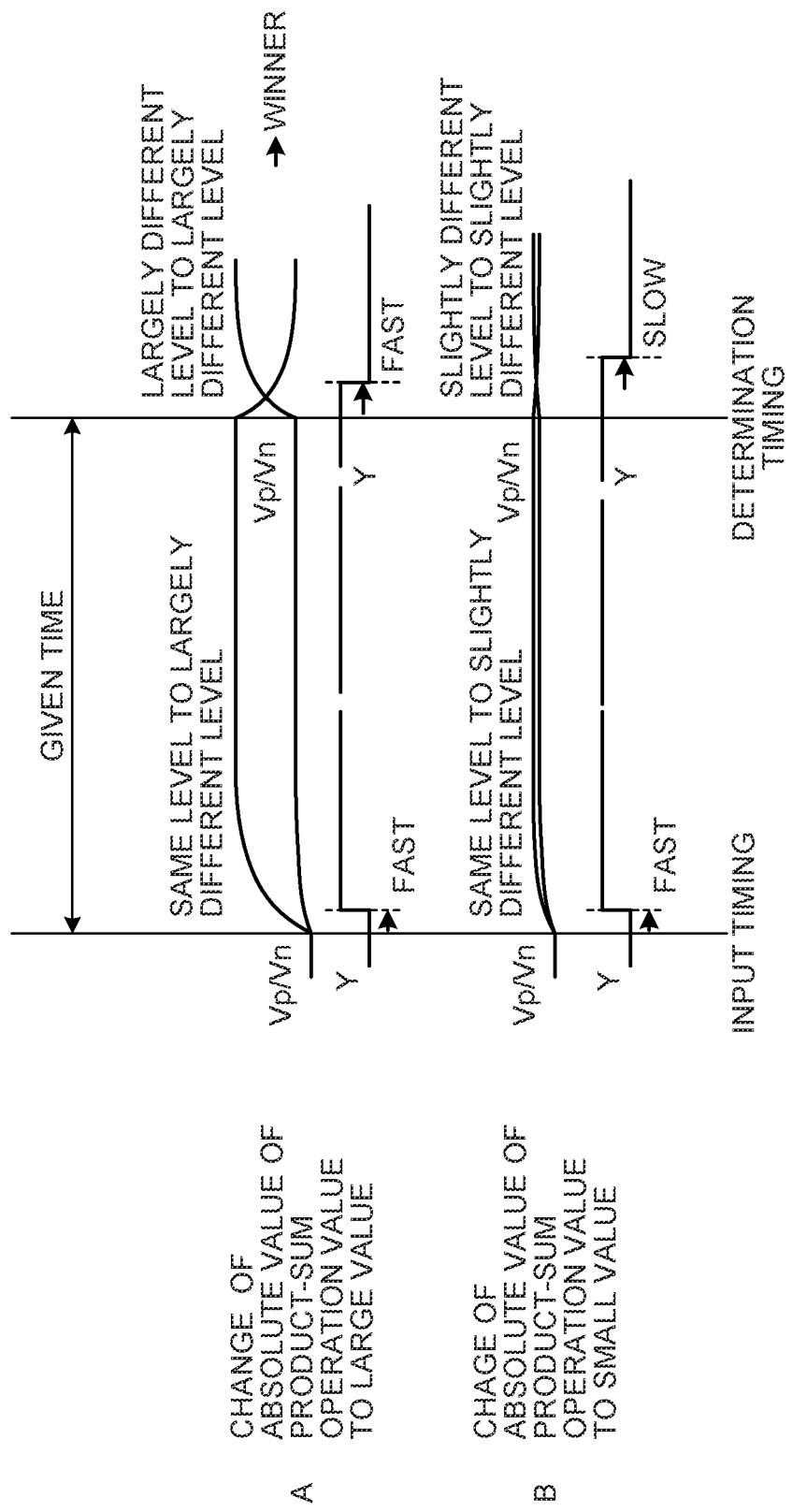
FIG. 5 is a diagram illustrating an example of a signal waveform inside an arithmetic device.

FIG. 5 is a diagram illustrating an example of a signal waveform of the product-sum operation circuit 20 having a comparator circuit.

For example, the product-sum operation circuit 20 includes a positive-side circuit, a negative-side circuit, and a comparator circuit. The positive-side circuit generates a positive-side signal representing the absolute value of the value obtained by totaling the positive multiplication values out of the M multiplication values generated by multiplying each of the M weight values by the corresponding input values of the M input values. For example, the positive-side circuit generates a positive-side signal having a voltage that represents the absolute value of the sum of the positive multiplication values. The negative-side circuit generates a negative-side signal representing the absolute value of the sum of the negative multiplication values out of the M multiplication values. For example, the negative-side circuit generates a negative-side signal having a voltage that represents the absolute value of the sum of the negative multiplication values. Therefore, the difference between the positive-side signal and the negative-side signal represents the product-sum operation value obtained by performing a product-sum operation of the M weight values and the M input values.

The comparator circuit has inputs of a positive-side signal and a negative-side signal, compares the magnitude between the positive-side signal and the negative-side signal, and outputs a comparison result as an intermediate signal. For example, the comparator circuit outputs an intermediate signal of a first logic when the positive-side signal is larger than the negative-side signal, and outputs an intermediate signal of a second logic different from the first logic when the negative-side signal is greater than the positive-side signal. The product-sum operation circuit 20 having such a configuration can output an intermediate signal generated by binarizing the product-sum operation value obtained by performing a product-sum operation of M input values and M weight values.

Moreover, the comparator circuit is an asynchronous type. Therefore, the comparator circuit can start the product-sum operation individually from the input timing at which the M input values have changed and the determination timing at which the positive/negative of either the M input values or the M weight values has been inverted.

Here, in FIG. 5, Vp/Vn represents the voltage of the positive-side signal and the voltage of the negative-side signal input to the comparator circuit. Y represents an intermediate signal output from the comparator circuit.

The comparator circuit has a characteristic that the larger the voltage difference between the positive-side signal and the negative-side signal, the shorter the propagation delay time. The positive-side signal represents the absolute value of the total of the positive multiplication values out of the M multiplication values, and the negative-side signal represents the absolute value of the total of the negative multiplication values out of the M multiplication values. Accordingly, the difference between the positive-side signal and the negative-side signal represents the absolute value of the product-sum operation value. Consequently, the larger the absolute value of the product-sum operation value, the shorter the propagation delay time achieved by the comparator circuit.

Furthermore, the comparator circuit has a variable propagation delay time depending on an immediately preceding potential difference between the positive-side signal and the negative-side signal. For example, when the immediately preceding potential difference between the positive-side signal and the negative-side signal is very small, the comparator circuit has a very small variation in the propagation delay time corresponding to the magnitude of the potential difference between the positive-side signal and the negative-side signal. That is, the propagation delay time of the comparator circuit would be affected by the immediately preceding product-sum operation value.

Therefore, in the present embodiment, the arithmetic device 16 allows a given time to elapse from the input timing at which the M input values change. This makes the potential difference between the positive-side signal and the negative-side signal input to the comparator circuit a value according to the product-sum operation value calculated by the current operation.

Furthermore, at a determination timing when a given period has elapsed from the input timing, the arithmetic device 16 inverts either the positive/negative of the M input values or the positive/negative of the M input values. This operation inverts the logic of the intermediate signal output from the comparator circuit. The inversion delay time from the determination timing to the inversion of the logic of the intermediate signal would not be affected by the immediately preceding product-sum operation value, and is determined by the magnitude of the product-sum operation value calculated by the current operation.

Furthermore, based on the inversion delay time of each of the N product-sum operation circuits 20, the arithmetic device 16 determines a winner product-sum operation circuit for which the product-sum operation value having a given sign and the largest absolute value is calculated among the N product-sum operation circuits 20. Subsequently, the output circuit 24 outputs an output signal (z) representing the determined winner product-sum operation circuit. With this configuration, the arithmetic device 16 can surely determine the product-sum operation circuit 20, for which the product-sum operation value having a given sign and the largest absolute value is calculated, as the winner product-sum operation circuit.

Figure 6:
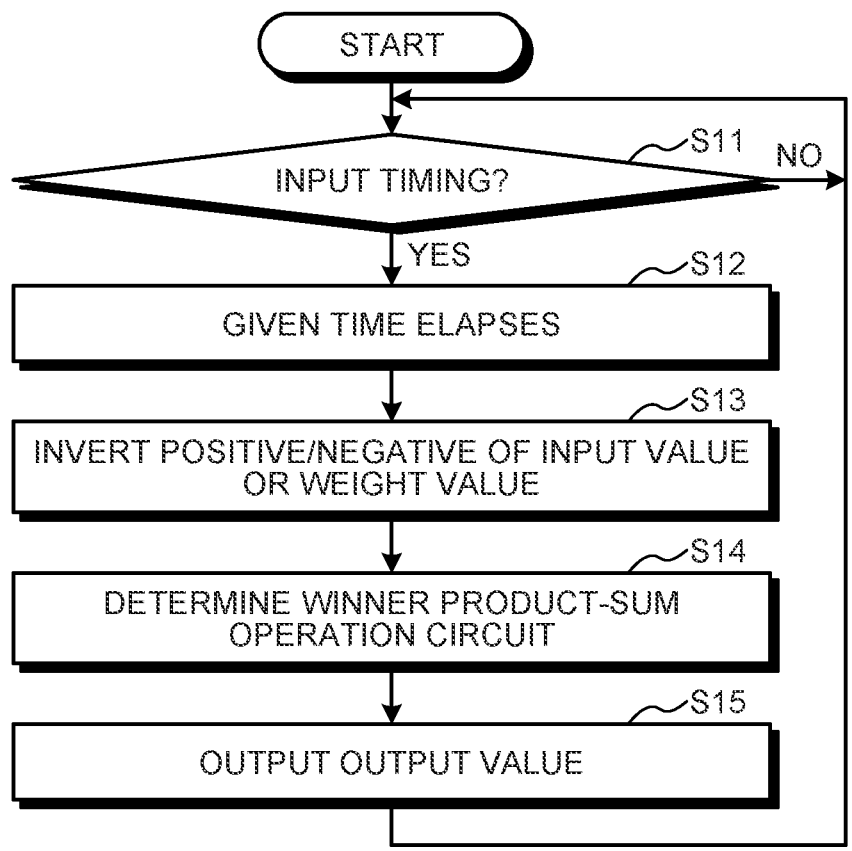
FIG. 6 is a flowchart illustrating a processing flow of the arithmetic device.

FIG. 6 is a flowchart illustrating a processing flow of the arithmetic device 16. The arithmetic device 16 executes the process according to the flow illustrated in FIG. 6, for example.

First, the input circuit 18 determines in S11 whether the M input values represented by the M input signals have changed. For example, the input circuit 18 determines whether the value of at least one of the M input signals has changed. In a case where no input signal value has changed (No in S11), the input circuit 18 waits for processing in S11. In a case where the value of at least one of the M input signals has changed (Yes in S11), the input circuit 18 supplies an input timing signal indicating an input timing to the control circuit 22. Subsequently, each of the N product-sum operation circuits 20 starts a product-sum operation of the changed M input values and the set M weight values from the input timing at which the M input values have changed.

Subsequently, in S12, the control circuit 22 waits for a given time after receiving the input timing signal. The given period is a preset time. For example, the given time is the time needed for finalization of the value of the intermediate signal output from the product-sum operation circuit 20 regardless of the input patterns of the M input values.

Subsequently, in S13, the control circuit 22 inverts the positive/negative of each of the M weight values at the determination timing when a given time has elapsed after receiving the input timing signal. At the same time, the control circuit 22 supplies a determination timing signal to the output circuit 24. Each of the N product-sum operation circuits 20 starts, from the determination timing, the product-sum operation of the M input values and the M weight values after the positive/negative inversion.

Instead of inverting the positive/negative of each of the M weight values, the control circuit 22 may invert the positive/negative of each of the M input values. In this case, each of the N product-sum operation circuits 20 starts, from the determination timing, the product-sum operation of the M input values and the M weight values after the positive/negative inversion.

Subsequently, the output circuit 24 determines in S14 the product-sum operation circuit 20 that outputs an intermediate signal for which the sign of the calculated product-sum operation value is a given sign and the inversion delay time is the shortest, among the N product-sum operation circuits 20, as the winner product-sum operation circuit. For example, among the N product-sum operation circuits 20, the output circuit 24 determines the product-sum operation circuit 20 for which the sign becomes a given value after a determination timing and outputs the intermediate signal having the shortest inversion delay time, as the winner product-sum operation circuit.

Subsequently, the output circuit 24 outputs in S15 an output signal representing the winner product-sum operation circuit among the N product-sum operation circuits 20. After completion of S15, the arithmetic device 16 returns the process to S11 and repeats the process from S11.

Figure 7:
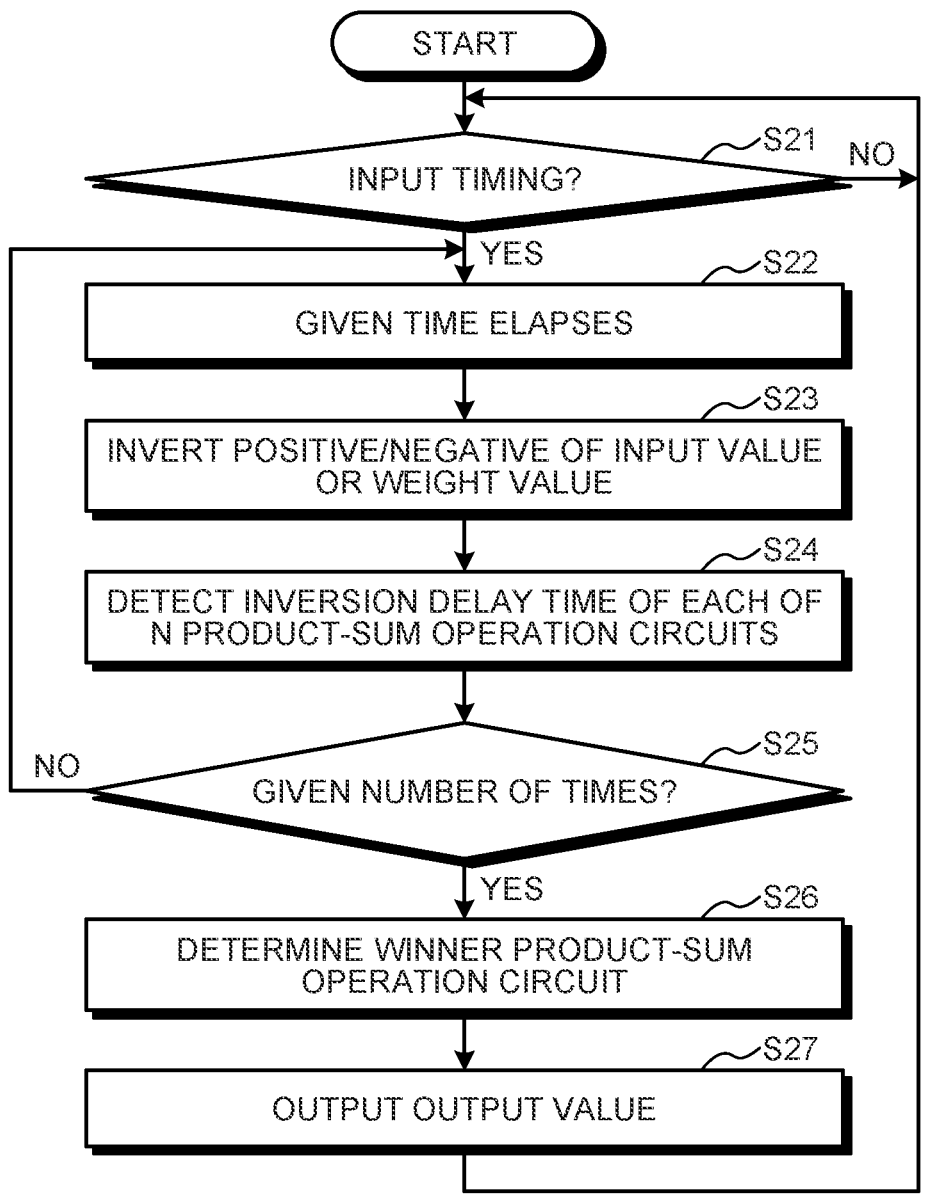
FIG. 7 is a flowchart illustrating a flow of another processing example of the arithmetic device.

FIG. 7 is a flowchart illustrating a flow of another processing example of the arithmetic device 16. The arithmetic device 16 may execute the process according to the flow illustrated in FIG. 7 instead of the process illustrated in FIG. 6.

First, the input circuit 18 determines in S21 whether the M input values represented by the M input signals have changed. The process of S21 is similar to the process of S11 in FIG. 6.

Subsequently, in S22, the control circuit 22 waits for a given time after receiving the input timing signal. The process of S22 is the similar to the process of S12 in FIG. 6.

Subsequently, in S23, the control circuit 22 inverts the positive/negative of each of the M weight values at the determination timing when a given time has elapsed after receiving the input timing signal. At the same time, the control circuit 22 supplies a determination timing signal to the output circuit 24. Instead of inverting the positive/negative of each of the M weight values, the control circuit 22 may invert the positive/negative of each of the M input values. The process of S23 is the similar to the process of S13 in FIG. 6.

Subsequently, the output circuit 24 detects in S24 the inversion delay time from the determination timing to the inversion of the logic of the output intermediate signal for each of the N product-sum operation circuits 20. The output circuit 24 stores the inversion delay time of each of the N product-sum operation circuits 20.

Subsequently, in S25, the control circuit 22 judges whether the process of inverting the positive/negative of each of the M weight values or the process of inverting the positive/negative of each of the M input values has been repeated a given number of times. In a case where the process has not been repeated a given number of times (No in S25), the control circuit 22 returns the process to S22 and controls to repeat the process from S22. In a case where the process has been repeated a given number of times (Yes in S25), the control circuit 22 proceeds to the process of S26.

The output circuit 24 determines in S26 the product-sum operation circuit 20 that outputs an intermediate signal for which the sign of the calculated product-sum operation value is a given sign and having the smallest average of a plurality of inversion delay times, among the N product-sum operation circuits 20, as the winner product-sum operation circuit. For example, among the N product-sum operation circuits 20, the output circuit 24 determines the product-sum operation circuit 20 for which the value becomes the given value after the determination timing and outputs an intermediate signal having the smallest average of a plurality of inversion delay times, as the winner product-sum operation circuit.

Subsequently, in S27, the output circuit 24 outputs an output signal representing the winner product-sum operation circuit among the N product-sum operation circuits 20. After completion of S27, the arithmetic device 16 returns the process to S21 and repeats the process from S21.

FIG. 8 is a diagram illustrating processes in the layer circuit 12. For example, the layer circuit 12, processes of which are illustrated in FIG. 8, receives 16 input signals and includes 16 product-sum operation circuits 20 (A to X). Each of the circuits A to X in FIG. 8 corresponds to one of the 16 product-sum operation circuits 20 and represents 16 weight values set in the corresponding product-sum operation circuit 20. In FIG. 8, each of the 16 input values is either −1 or +1. Moreover, each of the 16×16 weight values is either −1 or +1.

A product-sum operation value (μ) represents the product-sum operation value obtained from 16 input values (x) and the set 16 weight values (w). The product-sum operation value has a positive or negative sign, and the absolute value is a multi-value.

Furthermore, each of the 16 product-sum operation circuits 20 outputs an intermediate signal obtained by binarizing the product-sum operation value obtained by internal operation. The value (y) represented by the intermediate signal is, for example, −1 or +1.

Furthermore, based on the value (y) of the intermediate signal output from each of the 16 product-sum operation circuits 20, the layer circuit 12 in FIG. 8 determines the product-sum operation circuit 20 that calculates a product-sum operation value having a given sign and having the largest absolute value, among the 16 product-sum operation circuits 20, as the winner product-sum operation circuit. For example, the layer circuit 12 of FIG. 8 determines the product-sum operation circuit 20 that calculates the product-sum operation value having a positive sign and the largest absolute value, as the winner product-sum operation circuit.

In addition, the layer circuit 12 outputs an output signal representing the winner product-sum operation circuit. For example, the layer circuit 12 outputs an output signal including M output values corresponding to N product-sum operation circuits 20. The layer circuit 12 sets the value corresponding to the winner product-sum operation circuit among the M output values as the first logic (for example, 1), and sets all the M values corresponding to the circuits other than the winner product-sum operation circuit, among the M values, as the second logic (for example, 0).

The layer circuit 12 configured like this determines the winner product-sum operation circuit based on the inversion delay time of each of the plurality of product-sum operation circuits 20. Therefore, even when the value (y) represented by the intermediate signal output from the product-sum operation circuit 20 other than the winner product-sum operation circuit has a given sign (for example, +1), the layer circuit 12 can determine an appropriate winner product-sum operation circuit.

The neural network device 10 including the layer circuit 12 like this would not have to execute a learning process until the value represented by the intermediate signal output from the target product-sum operation circuit 20 is set as the first logic (for example, +1) and the value represented by the intermediate signal output from the product-sum operation circuit 20 other than the target circuit becomes the second logical value (for example, −1). That is, the neural network device 10 does not have to execute the learning process until an exclusive state where only the target product-sum operation circuit 20 out of the N product-sum operation circuits 20 fires. This enables the neural network device 10 to shorten the learning time.

As described above, the neural network device 10 according to the present embodiment can accurately generate an output signal representing the product-sum operation circuit that calculates the product-sum operation value having the given sign and the largest absolute value, leading to achievement of the reduction of the learning time.

In addition, each of the N product-sum operation circuits 20 may include, in the output stage, a delay circuit instead of a comparator circuit. For example, each of the N product-sum operation circuits 20 may include a delay circuit or the like using a capacitor for which the larger the absolute value of the product-sum operation value, the faster the charge of electric charges and faster the response.

For example, the delay circuit may be configured such that the larger the product-sum operation value (that is, when the sign is positive and the larger the absolute value), the shorter or longer the delay time from the start of the product-sum operation to the finalization of the logic of the intermediate signal. In the case where the larger the product-sum operation value, the shorter the delay time from the start of the product-sum operation to the finalization of the logic of the intermediate signal, the output circuit 24 determines the product-sum operation circuit 20 having the shortest delay time, or the product-sum operation circuit 20 having the shortest average of the plurality of the delay times, out of the N product-sum operation circuits 20, as the winner product-sum operation circuit. Furthermore, in the case where the larger the product-sum operation value, the longer the delay time from the start of the product-sum operation to the finalization of the logic of the intermediate signal, the output circuit 24 determines the product-sum operation circuit 20 having the longest delay time, or the product-sum operation circuit 20 having the longest average of the plurality of the delay times, out of the N product-sum operation circuits 20, as the winner product-sum operation circuit.

Moreover, the delay time from the start of the product-sum operation until the finalization of logic of the intermediate signal may be the time from the start of the operation of the product-sum operation circuit 20 by the enable signal or the like to the output of the intermediate signal of a given value. For example, each of the N product-sum operation circuits 20 is provided with an enable signal. When the enable signal is in an invalid state, each of the N product-sum operation circuits 20 has stopped the intermediate signal output or the product-sum operation processing function. When the enable signal is in valid state, the product-sum operation processing function operates to enable output of an intermediate signal. In addition, the control circuit 22 put the enable signal to the invalid state until the determination timing, and turns the enable signal to the valid state at the determination timing. With this configuration, in each of the N product-sum operation circuits 20, the intermediate signal output or the product-sum operation processing function has been stopped until the determination timing, and the product-sum operation processing function operates to output an intermediate signal after the determination timing. In this case, the output circuit 24 detects the delay time from the determination timing to the timing at which the logic of the intermediate signal becomes a given value. Subsequently, the output circuit 24 determines the winner product-sum operation circuit based on the delay time detected for each of the N product-sum operation circuits 20. With this operation, by detecting the delay time from the determination timing to the finalization of the logic of the intermediate signal for each of the N product-sum operation circuits 20, the output circuit 24 can determine the winner product-sum operation circuit for which the product-sum operation value having a given sign and the largest absolute value is calculated.

Note that, instead of giving an enable signal to each of the N product-sum operation circuits 20, the control circuit 22 may turn on or off the power supply to each of the N product-sum operation circuits 20. In this case, the control circuit 22 turns off the power supply to each of the N product-sum operation circuits 20 until the determination timing, and turns on the power supply at the determination timing. Even with this operation, by detecting the delay time from the determination timing to the finalization of the logic of the intermediate signal for each of the N product-sum operation circuits 20, the output circuit 24 can determine the winner product-sum operation circuit for which the product-sum operation value having a given sign and the largest absolute value is calculated.

Specific Example of Product-Sum Operation Circuit 20

In the present embodiment, the circuit illustrated in JP 2019-053563 A) is applicable to each of the N product-sum operation circuits 20. Hereinafter, the product-sum operation circuit 20 to which the circuit illustrated in JP 2019-053563 A) is applied will be described.

Figure 9:
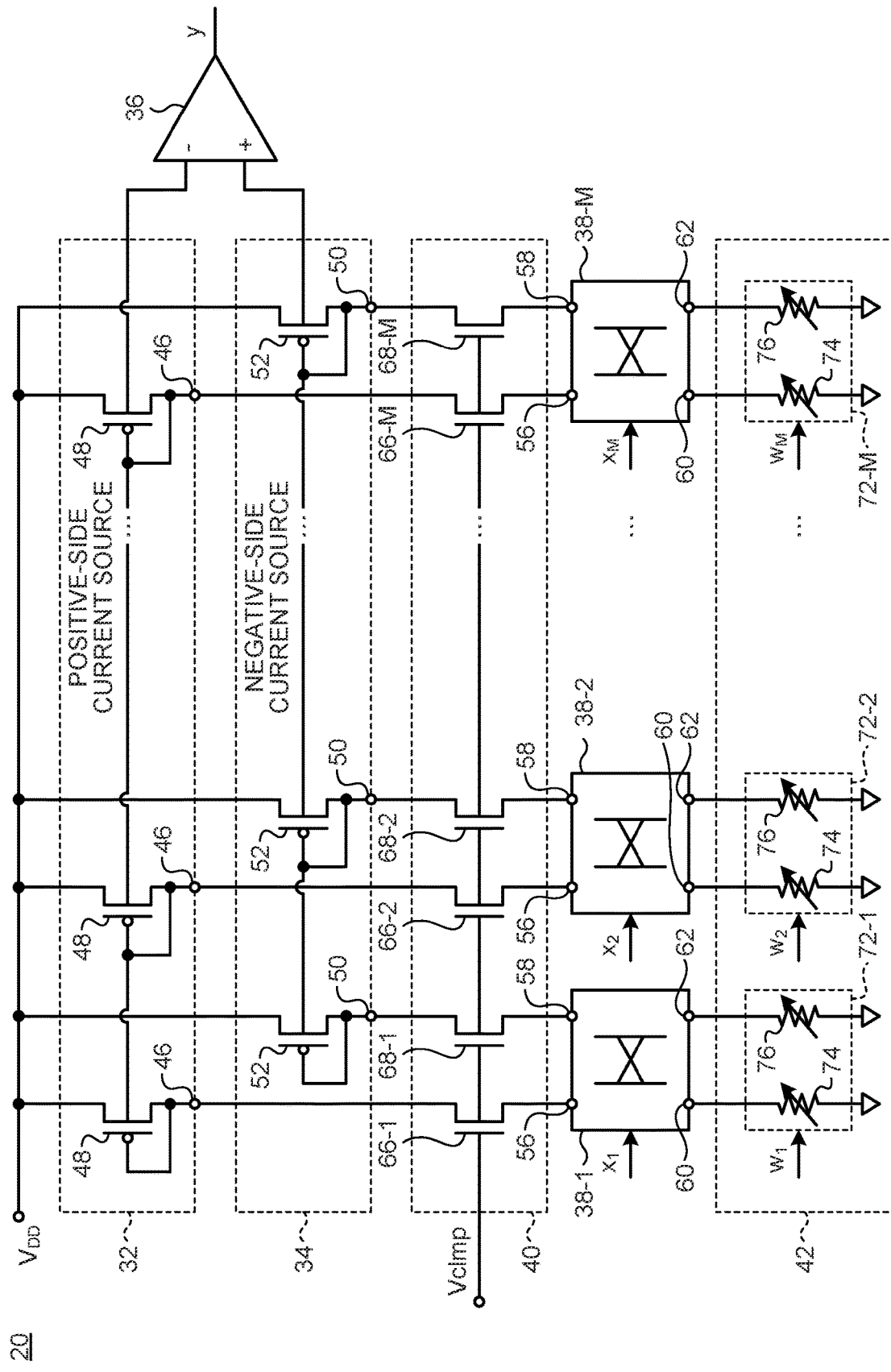
FIG. 9 is a hardware configuration diagram of product-sum operation circuit.

FIG. 9 is a diagram illustrating a hardware configuration of the product-sum operation circuit 20. The product-sum operation circuit 20 includes a positive-side current source 32, a negative-side current source 34, a comparison unit 36, M cross switches 38, a clamp circuit 40, and a storage circuit 42.

The positive-side current source 32 has a positive side terminal 46. The positive-side current source 32 outputs a current from the positive side terminal 46. Furthermore, the positive-side current source 32 outputs a first voltage corresponding to the value being 1/L (L is an integer of 2 or more) of the current output from the positive side terminal 46. The positive-side current source 32 is an example of a positive-side circuit. The first voltage is an example of a positive-side signal.

For example, the positive-side current source 32 outputs a first voltage proportional to the value being 1/L of the current output from the positive side terminal 46. In the present embodiment, L=M. However, L does not have to be the same as M. Note that FIG. 9 illustrates a plurality of positive side terminals 46. However, the plurality of positive side terminals 46 illustrated in FIG. 9 are electrically connected.

For example, the positive-side current source 32 includes L first FETs 48. Each of the L first FETs 48 is a field effect transistor having the same characteristics. In the present embodiment, each of the L first FETs 48 is a pMOS transistor having the same characteristics.

The L first FETs 48 have a gate connected in common, a source connected to a second reference potential, and a drain connected to the gate and positive side terminal 46. The second reference potential is a positive-side power supply voltage ($V_{DD}$), for example. That is, each of the L first FETs 48 operates as a diode-connected transistor, in which the source is connected to the second reference potential (for example, $V_{DD}$), and the gate and drain are connected to the positive side terminal 46. In addition, the positive-side current source 32 outputs the voltage of the positive side terminal 46 (voltage of the gate of the first FET 48) as the first voltage.

The negative-side current source 34 has a negative side terminal 50. The negative-side current source 34 outputs a current from the negative side terminal 50. Furthermore, the negative-side current source 34 outputs a second voltage corresponding to the value being 1/L of the current output from the negative side terminal 50. The negative-side current source 34 is an example of a negative-side circuit. The second voltage is an example of a negative-side signal.

For example, the negative-side current source 34 outputs a second voltage proportional to the value being 1/L of the current output from the negative side terminal 50. Note that FIG. 9 illustrates a plurality of negative terminals 50. However, the plurality of negative terminals 50 are electrically connected.

For example, the negative-side current source 34 includes L second FETs 52. Each of the L second FETs 52 is a field effect transistor having the same characteristics as the first FET 48. In the present embodiment, each of the L second FETs 52 is a pMOS transistor having the same characteristics as the first FET 48.

The L second FETs 52 have a gate connected in common, a source connected to a second reference potential, and a drain connected to the gate and negative side terminal 50. That is, each of the L second FETs 52 operates as a diode-connected transistor, in which the source is connected to the second reference potential (for example, $V_{DD}$), and the gate and drain are connected to the negative side terminal 50. In addition, the negative-side current source 34 outputs the voltage of the negative side terminal 50 (voltage of the gate of the second FET 52) as the second voltage.

The comparison unit 36 is an example of a comparator circuit. The comparison unit 36 compares the magnitude of the first voltage output from the positive-side current source 32 and the second voltage output from the negative-side current source 34. Subsequently, the comparison unit 36 outputs an intermediate signal (y) having a value corresponding to the comparison result between the first voltage and the second voltage. The comparison unit 36 outputs an intermediate signal of the first logic (for example, −1) when the first voltage is lower than the second voltage, and outputs an intermediate signal of the second logic (for example, +1) when the first voltage is the second voltage or more. The comparison unit 36 may output an intermediate signal of the second logic (for example, +1) when the first voltage is lower than the second voltage, and may output an intermediate signal of the first logic (for example, −1) when the first voltage is the second voltage or more.

Each of the M cross switches 38 is provided correspondingly to each of the M input signals. In the present embodiment, the product-sum operation circuit 20 includes a first cross switch 38-1 to an M-th cross switch 38-M as M cross switches 38. For example, the first cross switch 38-1 corresponds to the first input signal ($x_1$), the second cross switch 38-2 corresponds to the second input signal ($x_2$), and the M-th cross switch 38-M corresponds to the M-th input signal ($x_M$).

Each of the M cross switches 38 has a positive inflow terminal 56, a negative inflow terminal 58, a first terminal 60, and a second terminal 62.

Each of the M cross switches 38 connects the first terminal 60 to either the positive inflow terminal 56 or the negative inflow terminal 58. Furthermore, each of the M cross switches 38 connects the second terminal 62 to the other of the positive inflow terminal 56 and the negative inflow terminal 58 to which the first terminal 60 is not connected. Each of the M cross switches 38 switches whether the first terminal 60 and the second terminal 62 are to be connected to which of the positive inflow terminal 56 or the negative inflow terminal 58 depending on the value of the corresponding input signal.

The clamp circuit 40 includes M positive FET switches 66 each of which corresponding to each of the M cross switches 38. In the present embodiment, the clamp circuit 40 includes a first positive FET switch 66-1 to an M-th positive FET switch 66-M as the M positive FET switches 66. For example, the first positive FET switch 66-1 corresponds to the first cross switch 38-1, the second positive FET switch 66-2 corresponds to the second cross switch 38-2, and the M-th positive FET switch 66-M corresponds to the M-th cross switch 38-M.

Each of the M positive FET switches 66 has a configuration in which the gate is connected to a clamp potential ($V_{clmp}$), the source is connected to the positive side terminal 46, and the drain is connected to the corresponding positive inflow terminal 56 of the cross switch 38. Each of the M positive FET switches 66 is turned on between the source and the drain during operation. Therefore, the positive inflow terminal 56 of each of the M cross switches 38 is connected to the positive side terminal 46 of the positive-side current source 32 during operation, and the voltage is fixed to the clamp potential ($V_{clmp}$).

The clamp circuit 40 further includes M negative FET switches 68 each of which corresponding to each of the M cross switches 38. In the present embodiment, the clamp circuit 40 includes a first negative FET switch 68-1 to an M-th negative FET switch 68-M as the M negative FET switches 68. For example, the first negative FET switch 68-1 corresponds to the first cross switch 38-1, the second negative FET switch 68-2 corresponds to the second cross switch 38-2, and the M-th negative FET switch 68-M corresponds to the M-th cross switch 38-M.

Each of the M negative FET switches 68 has a configuration in which the gate is connected to a clamp potential ($V_{clmp}$), the source is connected to the negative side terminal 50, and the drain is connected to the corresponding negative inflow terminal 58 of the cross switch 38. Each of the M negative FET switches 68 is turned on between the source and the drain during operation. Therefore, the negative inflow terminal 58 of each of the M cross switches 38 is connected to the negative side terminal 50 of the negative-side current source 34 during operation, and the voltage is fixed to the clamp potential ($V_{clmp}$).

The storage circuit 42 includes M cells 72 corresponding to each of the M weight values. In the present embodiment, the storage circuit 42 includes first cell 72-1 to M-th cell 72-M as the M cells 72. For example, the first cell 72-1 corresponds to the first weight value ($w_1$), the second cell 72-2 corresponds to the second weight value ($w_2$), and the M-th cell 72-M corresponds to the M-th weight value ($w_M$). The first weight value ($w_1$) corresponds to the first input signal ($x_1$), the second weight value ($w_2$) corresponds to the second input signal ($x_2$), and the M-th weight value ($w_M$) corresponds to the M-th input signal ($x_M$). Accordingly, for example, the first cell 72-1 corresponds to the first cross switch 38-1, the second cell 72-2 corresponds to the second cross switch 38-2, and the M-th cell 72-M corresponds to the M-th cross switch 38-M.

Each of the M cells 72 includes a first resistor 74 and a second resistor 76. The first resistor 74 is connected at one end to the first terminal 60 of the corresponding cross switch 38 while being connected at the other end to the first reference potential. The first reference potential is, for example, ground. The second resistor 76 is connected at one end to the second terminal 62 of the corresponding cross switch 38 while being connected at the other end to the first reference potential.

Each of the first resistor 74 and the second resistor 76 is a memristor. Furthermore, the first resistor 74 and the second resistor 76 may be other types of variable resistors. The magnitude relationship of the resistance values of the first resistor 74 and the second resistor 76 is switched depending on the corresponding weight values. For example, the control circuit 22 receives M weight values prior to receiving M input signals. Then, the control circuit 22 sets the magnitude relationship between the resistance values of the first resistor 74 and the second resistor 76 included in the corresponding cell 72 in accordance with each of the received M weight values.

For example, in each of the plurality of cells 72, when the corresponding weight value is +1, the first resistor 74 will be set to the first resistance value, and the second resistor 76 will be set to a second resistance value different from the first resistance value. Furthermore, in each of the plurality of cells 72, when the corresponding weight value is −1, the first resistor 74 will be set to the second resistance value, and the second resistor 76 will be set to the first resistance value.

Furthermore, in each of the plurality of cells 72, one of the first resistor 74 and the second resistor 76 may be a fixed resistor and the other may be a variable resistor. In this case, in each of the plurality of cells 72, the resistance value of the variable resistor is changed so that the positive/negative of the resistance difference between the first resistor 74 and the second resistor 76 are inverted depending on whether the corresponding weight value is +1 or −1.

In addition, each of the M cross switches 38 switches whether to use the straight connection or reverse connection on the first terminal 60 and the second terminal 62 with the positive side terminal 46 (positive inflow terminal 56) and the negative side terminal 50 (negative inflow terminal 58) in accordance with the corresponding input signal values.

For example, when using straight connection, each of the M cross switches 38 connects the first terminal 60 with the positive side terminal 46 (positive inflow terminal 56) and connects the second terminal 62 with the negative side terminal 50 (negative inflow terminal 58). Furthermore, when using reverse connection, each of the M cross switches 38 connects the first terminal 60 with the negative side terminal 50 (negative inflow terminal 58) and connects the second terminal 62 with the positive side terminal 46 (positive inflow terminal 56).

For example, each of the M cross switches 38 uses the straight connection when the corresponding input signal value is +1 and uses the reverse connection when the corresponding input signal value is −1. Instead, each of the M cross switch 38 may use the reverse connection when the corresponding input signal value is +1 and may use the straight connection when the corresponding input signal value is −1.

Figure 10:
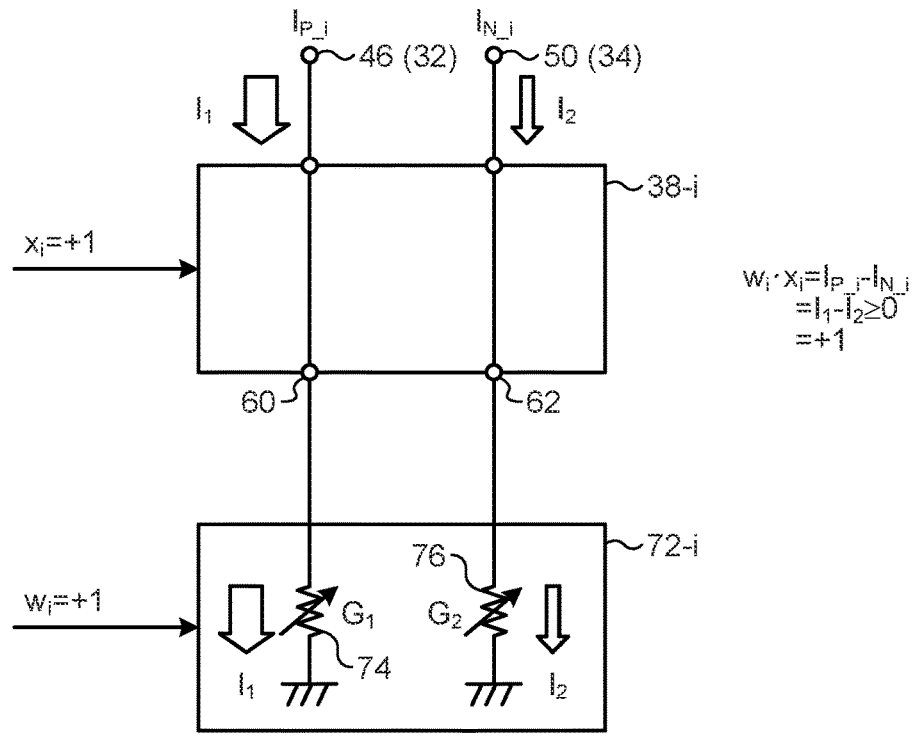
FIG. 10 is a diagram illustrating an arithmetic operation when $w_i=+1$ and $x_i=+1$.

FIG. 10 is a diagram illustrating arithmetic operation of the product-sum operation circuit 20 when $w_i$=+1 and $x_i$=+1. When the i-th weight value ($w_i$) is +1, the first resistor 74 of the i-th cell 72-$i$ is set to a first conductance ($G_1$=1/$R_1$). When the i-th weight value ($w_i$) is +1, the second resistor 76 of the i-th cell 72-$i$ is set to a second conductance ($G_2$=1/$R_2$). In this case, the current of a first current value ($I_1$) flows through the first resistor 74. Furthermore, a current having a second current value ($I_2$) flows through the second resistor 76. Note that $G_1$>$G_2$. Therefore, $I_1$>$I_2$ is established.

Furthermore, when the i-th input signal ($x_i$) is +1, the i-th cross switch 38-$i$ uses the straight connection. Therefore, the positive side terminal 46 of the positive-side current source 32 supplies current to the first resistor 74 of the i-th cell 72-$i$. Furthermore, the negative side terminal 50 of the negative-side current source 34 supplies current to the second resistor 76 of the i-th cell 72-$i$.

Here, the product-sum operation circuit 20 represents a calculation result of a value ($w_i·x_i$) obtained by multiplying the i-th weight value ($w_i$) by the i-th input signal ($x_i$) by using a current difference ($I_{P\_i}$−$I_{N\_i}$) between the current ($I_{P\_i}$) flowing from the positive side terminal 46 to the i-th cell 72-$i$ and the current ($I_{N\_i}$) flowing from the negative side terminal 50 to the i-th cell 72-$i$.

Therefore, in the example of FIG. 10, $I_{P\_i}$=$I_1$ and $I_{N\_i}$=$I_2$ are established, and the current difference ($I_{P\_i}$−$I_{N\_i}$) will be a positive value. Therefore, when $w_i$=+1 and $x_i$=+1, the product-sum operation circuit 20 can calculate +1 as the value ($w_i·x_i$) obtained by multiplying the i-th weight value ($w_i$) and the i-th input signal ($x_i$).

Figure 11:
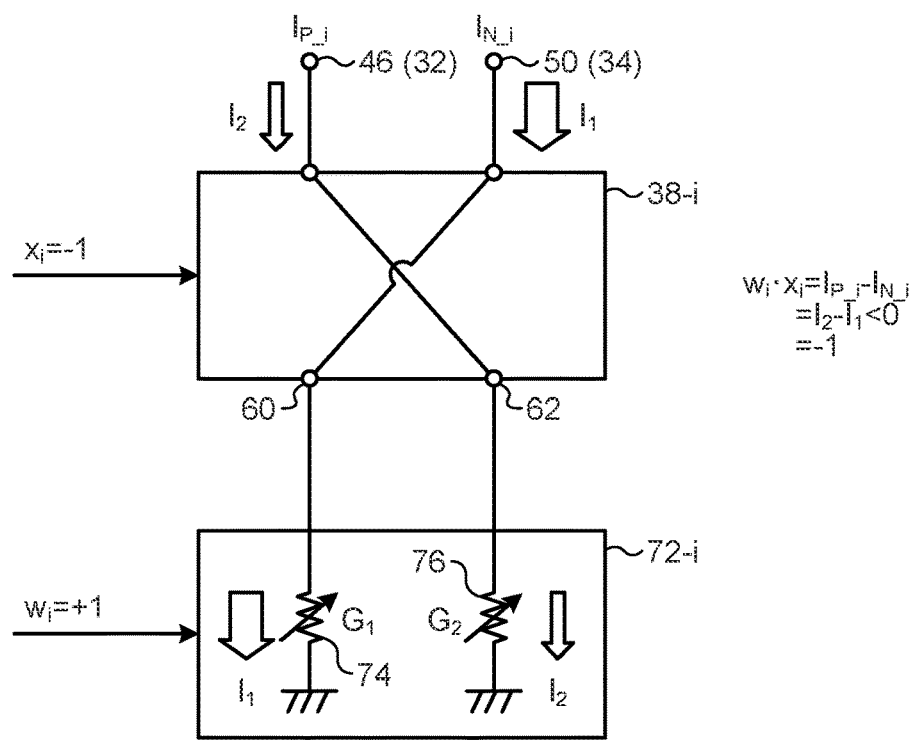
FIG. 11 is a diagram illustrating an arithmetic operation when $w_i=+1$ and $x_i=-1$.

FIG. 11 is a diagram illustrating arithmetic operation of the product-sum operation circuit 20 when $w_i$=+1 and $x_i$=−1. When the i-th weight value ($w_i$) is +1, the first resistor 74 of the i-th cell 72-$i$ is set to the first conductance ($G_1$). When the i-th weight value ($w_i$) is +1, the second resistor 76 of the i-th cell 72-$i$ is set to the second conductance ($G_2$). In this case, the current of a first current value ($I_1$) flows through the first resistor 74. Furthermore, a current having a second current value ($I_2$) flows through the second resistor 76.

When the i-th input signal (x) is −1, the i-th cross switch 38-$i$ uses the reverse connection. Therefore, the positive side terminal 46 of the positive-side current source 32 supplies current to the second resistor 76 of the i-th cell 72-$i$. Furthermore, the negative side terminal 50 of the negative-side current source 34 supplies current to the first resistor 74 of the i-th cell 72-$i$.

Therefore, in the example of FIG. 11, $I_{P\_i}$=$I_2$ and $I_{N\_i}$=$I_1$ are established, and the current difference ($I_{P\_i}$−$I_{N\_i}$) will be a negative value. Therefore, when $w_i$=+1 and $x_i$=−1, the product-sum operation circuit 20 can calculate −1 as the value ($w_i·x_i$) obtained by multiplying the i-th weight value ($w_i$) and the i-th input signal ($x_i$).

Figure 12:
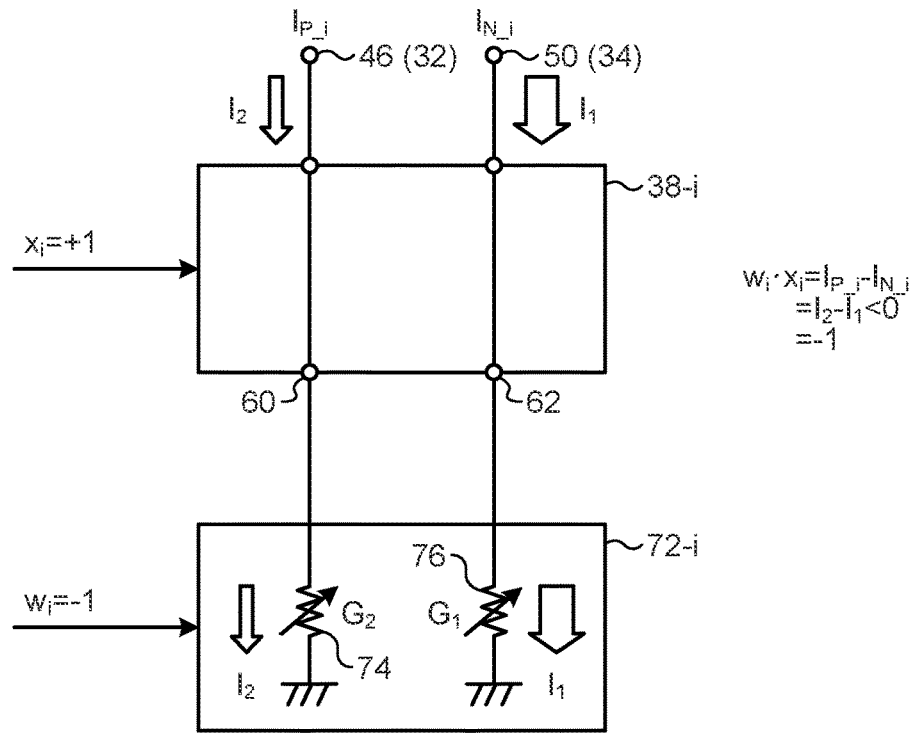
FIG. 12 is a diagram illustrating an arithmetic operation when $w_i=-1$ and $x_i=+1$.

FIG. 12 is a diagram illustrating arithmetic operation of the product-sum operation circuit 20 when $w_i$=−1 and $x_i$=+1. When the i-th weight value ($w_i$) is −1, the first resistor 74 of the i-th cell 72-$i$ is set to the second conductance ($G_2$). When the i-th weight value ($w_i$) is −1, the second resistor 76 of the i-th cell 72-$i$ is set to the first conductance ($G_1$). Therefore, in this case, the current of the second current value ($I_2$) flows through the first resistor 74. Furthermore, the current of the first current value ($I_1$) flows through the second resistor 76.

Furthermore, when the i-th input signal ($x_i$) is +1, the i-th cross switch 38-$i$ uses the straight connection. Therefore, the positive side terminal 46 of the positive-side current source 32 supplies current to the first resistor 74 of the i-th cell 72-$i$. Furthermore, the negative side terminal 50 of the negative-side current source 34 supplies current to the second resistor 76 of the i-th cell 72-$i$.

Therefore, in the example of FIG. 12, $I_{P\_i}$=$I_2$ and $I_{N\_i}$=$I_1$ are established, and the current difference ($I_{P\_i}$−$I_{N\_i}$) will be a negative value. Therefore, when $w_i$=−1 and $x_i$=+1, the product-sum operation circuit 20 can calculate −1 as the value ($w_i·x_i$) obtained by multiplying the i-th weight value ($w_i$) and the i-th input signal ($x_i$).

Figure 13:
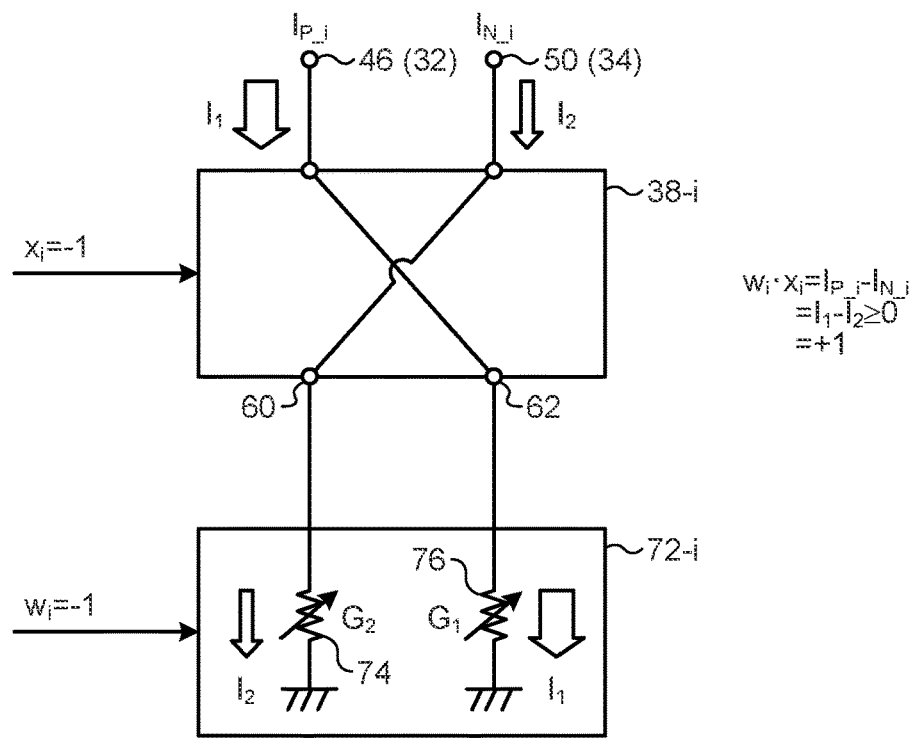
FIG. 13 is a diagram illustrating an arithmetic operation when $w_i=-1$ and $x_i=-1$.

FIG. 13 is a diagram illustrating arithmetic operation of the product-sum operation circuit 20 when $w_i$=−1 and $x_i$=−1. When the i-th weight value ($w_i$) is −1, the first resistor 74 of the i-th cell 72-*i* is set to the second conductance ($G_2$). When the i-th weight value ($w_i$) is −1, the second resistor 76 of the i-th cell 72-*i* is set to the first conductance ($G_1$). Therefore, in this case, the current of the second current value ($I_2$) flows through the first resistor 74. Furthermore, the current of the first current value ($I_1$) flows through the second resistor 76.

When the i-th input signal ($x_i$) is −1, the i-th cross switch 38-*i* uses the reverse connection. Therefore, the positive side terminal 46 of the positive-side current source 32 supplies current to the second resistor 76 of the i-th cell 72-*i*. Furthermore, the negative side terminal 50 of the negative-side current source 34 supplies current to the first resistor 74 of the i-th cell 72-*i*.

Therefore, in the example of FIG. 13, $I_{P\_i}=I_1$ and $I_{N\_i}=I_2$ are established, and the current difference ($I_{P\_i}-I_{N\_i}$) will be a positive value. Therefore, when $w_i=-1$ and $x_i=-1$, the product-sum operation circuit 20 can calculate +1 as the value ($w_i \cdot x_i$) obtained by multiplying the i-th weight value ($w_i$) and the i-th input signal ($x_i$).

As described above, the difference ($I_{P\_i}-I_{N\_i}$) between the current ($I_{P\_i}$) output from the positive side terminal 46 to the i-th cell 72-*i* and the current ($I_{N\_i}$) output from the negative side terminal 50 to the i-th cell 72-*i* represents the multiplication value ($w_i \cdot x_i$) of the i-th weight value ($w_i$) and the i-th input signal ($x_i$). Accordingly, the difference value $\{(I_{P\_1}+I_{P\_2}+\ldots+I_{P\_M})-(I_{N\_1}+I_{N\_2}+\ldots+I_{N\_M})\}$ between the total current ($I_{P\_1}+I_{P\_2}+\ldots+I_{P\_M}$) output from the positive side terminal 46 of the positive-side current source 32 and the total current ($I_{N\_1}+I_{N\_2}+\ldots+I_{N\_M}$) output from the negative side terminal 50 of the negative-side current source 34 represents the result of product-sum operation (multiply-accumulation) of M input signals and M weight values.

Figure 14:
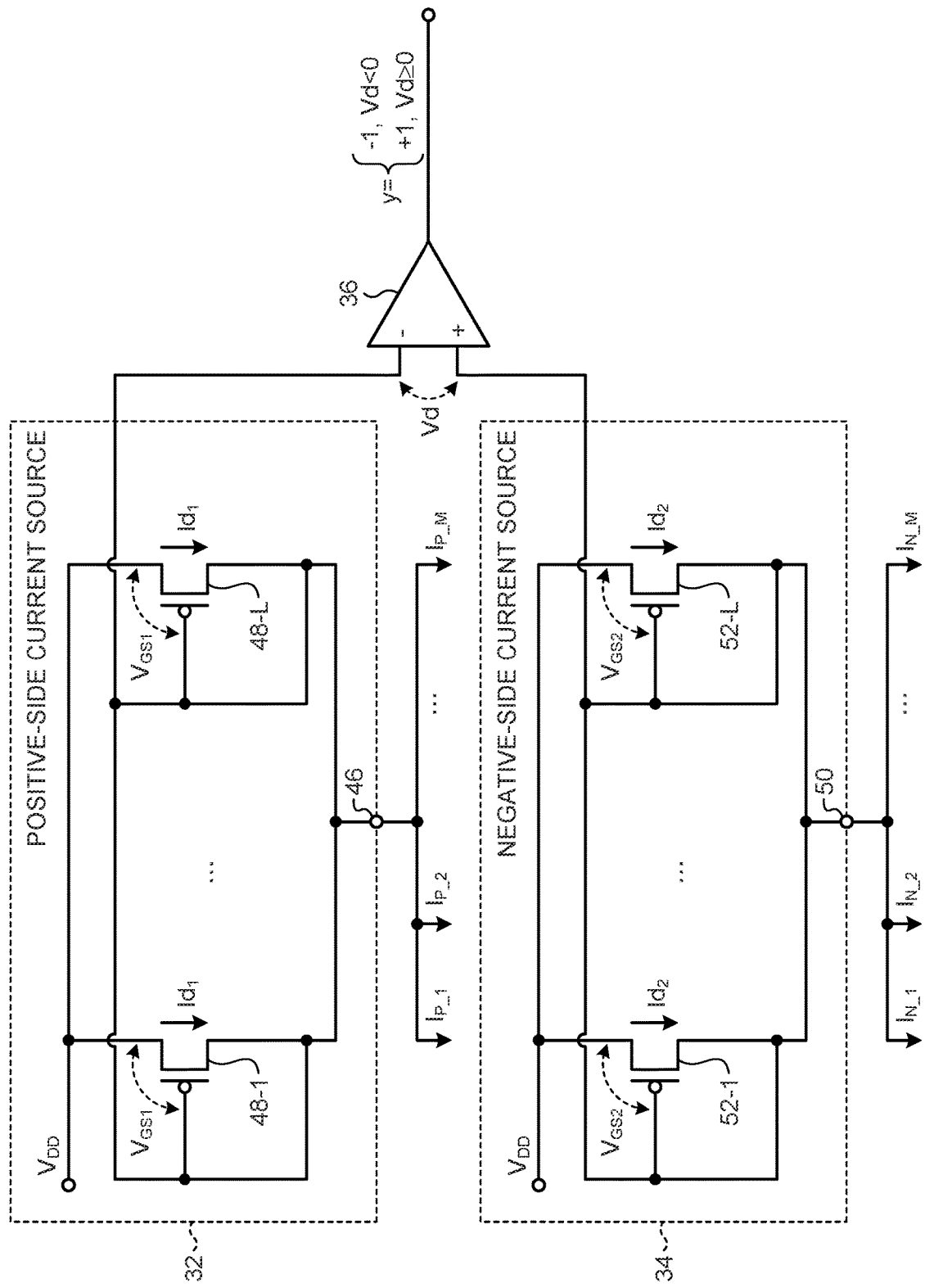
FIG. 14 is a diagram illustrating operation of a positive-side current source, a negative-side current source, and a comparator.

FIG. 14 is a diagram illustrating operations of the positive-side current source 32, the negative-side current source 34, and the comparison unit 36.

The positive-side current source 32 outputs the current of $I_{P\_1}$ to the first cell 72-1. Furthermore, the positive-side current source 32 outputs the current of $I_{P\_2}$ to the second cell 72-2. In addition, the positive-side current source 32 outputs the current of $I_{P\_M}$ to the M-th cell 72-M. Accordingly, the positive-side current source 32 outputs the current of $I_{P\_1}+I_{P\_2}+\ldots+I_{P\_M}$ from the positive side terminal 46.

Furthermore, the positive-side current source 32 includes L first FETs 48. The L first FETs 48 have the same characteristics and have the same connection relationship. Therefore, the L first FETs 48 carry a same drain current ($Id_1$).

The total drain current ($Id_1$) of the L first FET 48 is $L \times Id_1$. The drain currents ($Id_1$) of the L first FETs 48 will be entirely supplied to the positive side terminals 46. Therefore, $L \times Id_1 = (I_{P\_1}+I_{P\_2}+\ldots+I_{P\_M})$. That is, the drain current ($Id_1$) of each of the L first FETs 48 will be $(I_{P\_1}+I_{P\_2}+\ldots+I_{P\_M})/L$.

The negative-side current source 34 outputs the current of $I_{N\_1}$ to the first cell 72-1. Furthermore, the negative-side current source 34 outputs the current of $I_{N\_2}$ to the second cell 72-2. In addition, the negative-side current source 34 outputs the current of $I_{N\_M}$ to the M-th cell 72-M. Accordingly, the negative-side current source 34 outputs the current of $I_{N\_1}+I_{N\_2}+\ldots+I_{N\_M}$ from the negative side terminal 50.

The negative-side current source 34 includes L second FETs 52. The L second FETs 52 have the same characteristics and have the same connection relationship. Therefore, the L second FETs 52 carry a same drain current ($Id_2$).

The total drain current ($Id_2$) of the L second FETs 52 is $L \times Id_2$. The drain currents ($Id_2$) of the L second FETs 52 will be entirely supplied to the negative side terminal 50. Therefore, $L \times Id_2 = (I_{N\_1}+I_{N\_2}+\ldots+I_{N\_M})$. That is, the drain current ($Id_2$) of each of the L second FETs 52 will be $(I_{N\_1}+I_{N\_2}+\ldots+I_{N\_M})/L$.

The positive-side current source 32 outputs the voltage generated at the positive side terminal 46 as the first voltage. The voltage generated at the positive side terminal 46 is a potential obtained by subtracting a gate-source voltage ($V_{GS1}$) of the first FET 48 from the second reference potential (for example, $V_{DD}$).

Meanwhile, the negative-side current source 34 outputs the voltage generated at the negative side terminal 50 as the second voltage. The voltage generated at the negative side terminal 50 is a potential obtained by subtracting a gate-source voltage ($V_{GS2}$) of the second FET 52 from the second reference potential (for example, $V_{DD}$).

The comparison unit 36 determines whether a difference (Vd) between the first voltage and the second voltage is less than 0, or 0 or more. For example, the comparison unit 36 outputs the first logic (for example, −1) when the difference (Vd) between the first voltage and the second voltage is less than 0, and outputs the second logic (for example, +1) when the difference is 0 or more.

Here, the difference (Vd) between the first voltage and the second voltage is equal to the voltage obtained by subtracting the gate-source voltage ($V_{GS2}$) of the second FET 52 from the gate-source voltage ($V_{GS1}$) of the first FET 48.

The gate-source voltage ($V_{GS1}$) of the first FET 48 is a value proportional to the drain current ($Id_1$) of the first FET 48. The gate-source voltage ($V_{GS2}$) of the second FET 52 is a value proportional to the drain current ($Id_2$) of the second FET 52. Furthermore, the first FET 48 and the second FET 52 have the same characteristics. Therefore, the difference (Vd) between the first voltage and the second voltage is proportional to the current obtained by subtracting the drain current $((I_{N\_1}+I_{N\_2}+\ldots+I_{N\_M})/L)$ of the second FET 52 from the drain current $((I_{P\_1}+I_{P\_2}+\ldots+I_{P\_M})/L)$ of the first FET 48.

From the above, the intermediate signal (y) represents whether the current obtained by subtracting the drain current $((I_{N\_1}+I_{N\_2}+\ldots+I_{N\_M})/L)$ of the second FET 52 from the drain current $((I_{P\_1}+I_{P\_2}+\ldots+I_{P\_M})/L)$ of the first FET 48 is less than 0, or 0 or more.

Here, the number (L) of the first FETs 48 included in the positive-side current source 32 and the number (L) of the second FETs 52 included in the negative-side current source 34 are the same. Furthermore, the comparison unit 36 inverts the value with 0 as a threshold. The zero cross point of the current obtained by subtracting the drain current of the second FET 52 $((I_{N\_1}+I_{N\_2}+\ldots+I_{N\_M})/L)$ from the drain current of the first FET 48 $((I_{P\_1}+I_{P\_2}+\ldots+I_{P\_M})/L)$ is the same as the zero cross point of the current obtained by subtracting the total current $(I_{N\_1}+I_{N\_2}+\ldots+I_{N\_M})$ output by the negative side terminal 50 from the total current $(I_{P\_1}+I_{P\_2}+\ldots+I_{P\_M})$ output by the positive side terminal 46. Therefore, the intermediate signal (y) represents whether the current obtained by subtracting the total current $(I_{N\_1}+I_{N\_2}+\ldots+I_{N\_M})$ output by the negative side terminal 50 from the total current $(I_{P\_1}+I_{P\_2}+\ldots+I_{P\_M})$ output by the positive side terminal 46 is less than 0, or 0 or more.

The difference ($I_{P\_i}-I_{N\_i}$) between the current ($I_{P\_i}$) output from the positive side terminal 46 to the i-th cell 72-*i* and the current ($I_{N\_i}$) output from the negative side terminal 50 to the i-th cell 72-*i* represents the multiplication value ($w_i \cdot x_i$) of the i-th weight value ($w_i$) and the i-th input signal ($x_i$). In addition, the current obtained by subtracting the total current $(I_{N\_1}+I_{N\_2}+\ldots+I_{N\_M})$ output by the negative side terminal 50 from the total current $(I_{P\_1}+I_{P\_2}+\ldots+I_{P\_M})$ output by the positive side terminal 46 represents the product-sum operation (multiply-accumulation) value of the M input signals and M weight values.

Accordingly, the intermediate signal (y) represents whether the product-sum operation (multiply-accumulation) value of M input signals and M weight values is less than 0, or 0 or more.

In this manner, the product-sum operation circuit 20 can execute the product-sum operation (multiply-accumulation) with M weight values by analog processing. Consequently, the product-sum operation circuit 20 can generate an intermediate signal obtained by binarizing the product-sum operation value.

Figure 15:
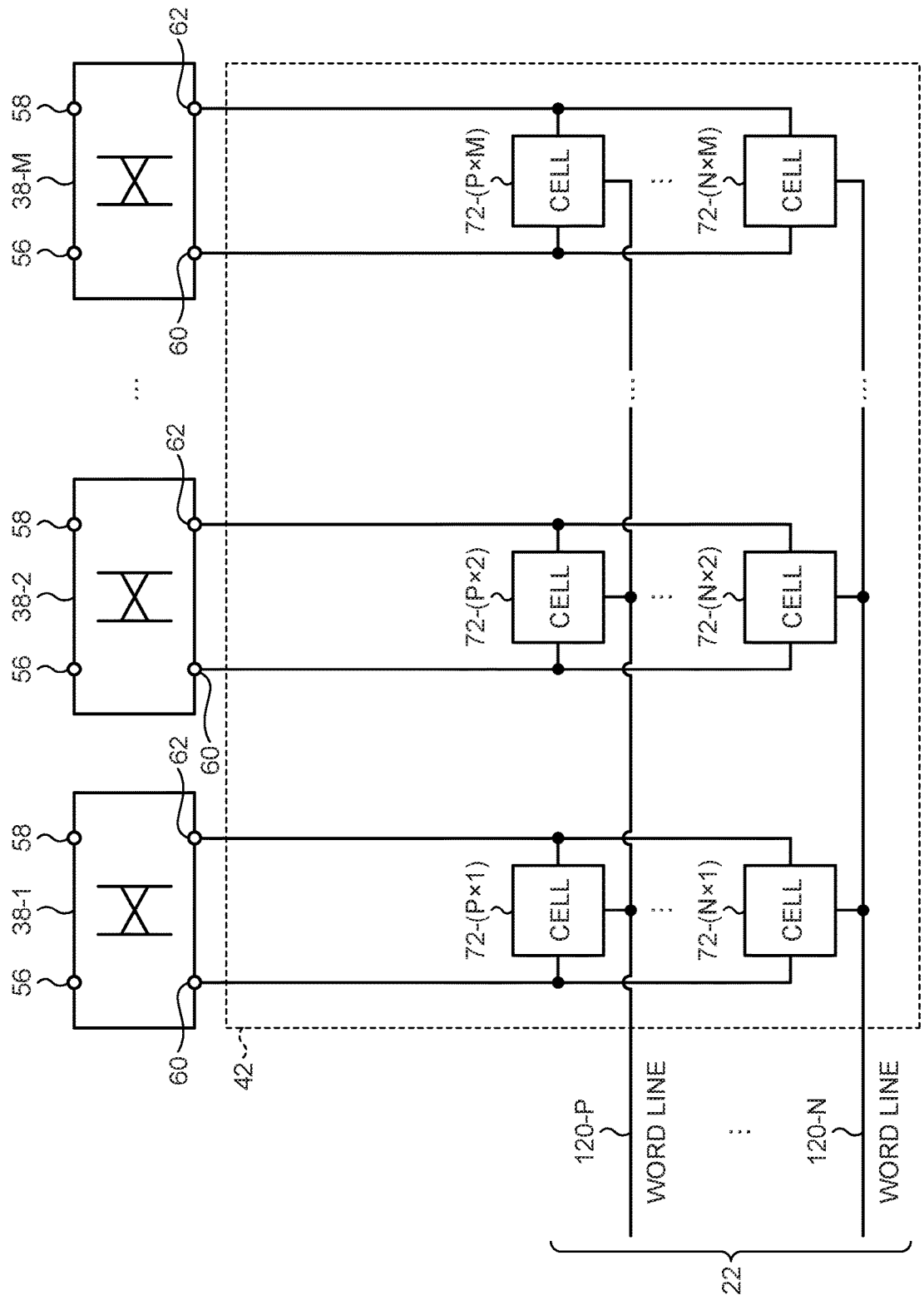
FIG. 15 is a configuration diagram of a coefficient storage unit according to a modification.

FIG. 15 is a diagram illustrating the configuration of the storage circuit 42 according to a modification together with the M cross switches 38. For example, the storage circuit 42 has two sets of M cells 72. That is, the storage circuit 42 has (M×2) cells 72.

The storage circuit 42 also includes two word lines 120 (120-P and 120N). The M cells 72 arranged in the first row are connected to the first word line 120-P. The M cells 72 arranged in the second row are connected to the second word line 120-N.

The M cells 72 arranged in the first row correspond to the first to M-th weight values ($w_1$ to $x_M$). The M cells 72 arranged in the second row correspond to the first to M-th inverted values for which the positive/negative of the first to M-th weight values ($w_1$ to $x_M$) are inverted.

Furthermore, in each of rows, the first cell 72-1 corresponds to the first cross switch 38-1, the second cell 72-2 corresponds to the second cross switch 38-2, and the M-th cell 72-M corresponds to the M-th cross switch 38-M. Furthermore, the first cell 72-1 arranged in each of rows is connected to the first terminal 60 and the second terminal 62 of the corresponding cross switch 38. That is, the first cell 72-1 arranged in each of rows is connected to the first terminal 60 and the second terminal 62 of the first cross switch 38-1. The second cell 72-2 is connected to the first terminal 60 and the second terminal 62 of the second cross switch 38-2. The M-th cell 72-M is connected to the first terminal 60 and the second terminal 62 of the M-th cross switch 38-M.

When setting M weight values for the corresponding product-sum operation circuit 20, the control circuit 22 sets the first word line 120-P to the H level voltage and sets the second word line 120-N to an L level voltage. When setting M inverted values for the corresponding product-sum operation circuit 20, the control circuit 22 sets the first word line 120-P to the L level voltage and sets the second word line 120-N to an H level voltage.

Figure 16:
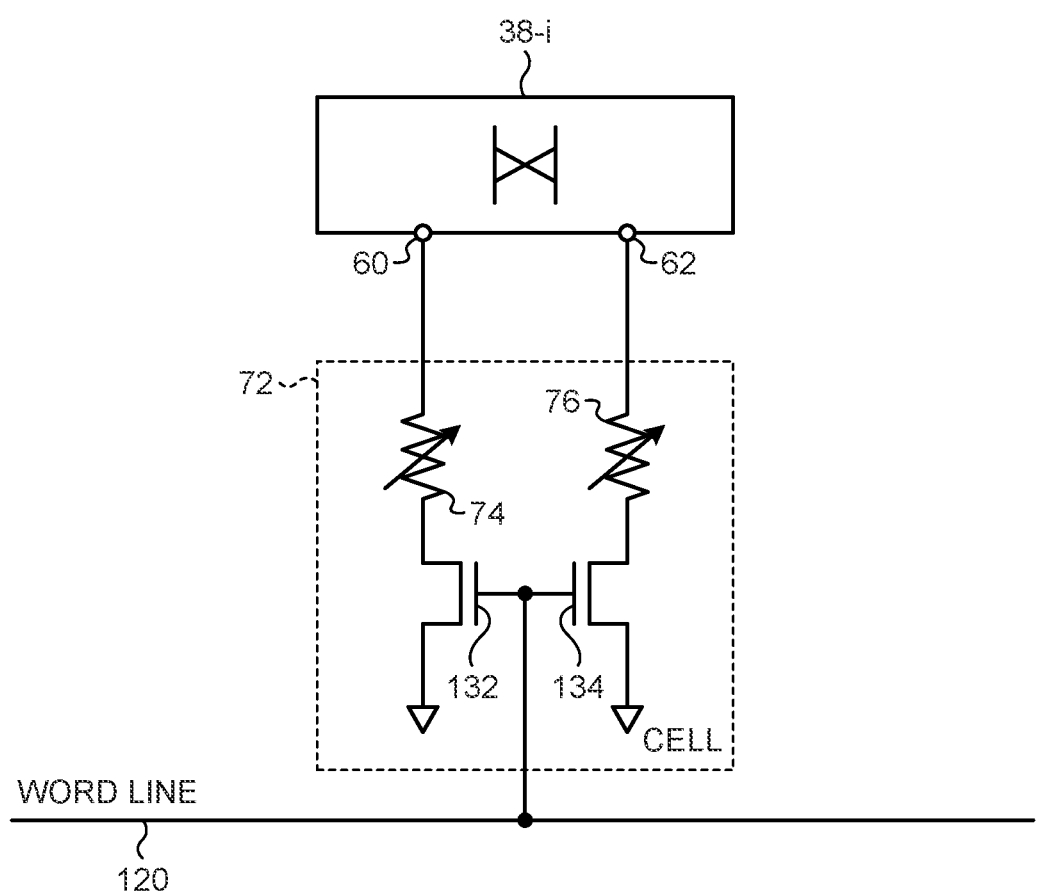
FIG. 16 is a configuration diagram of a cell according to a modification.

FIG. 16 is a diagram illustrating the configuration of the cell 72. Each of the plurality of cells 72 includes a first resistor 74, a second resistor 76, a first switch 132, and a second switch 134.

The first resistor 74 is connected at one end to the first terminal 60 of the corresponding cross switch 38 (i-th cross switch 38-$i$), and connected at the other end to the first reference potential (ground) via the first switch 132. The second resistor 76 is connected at one end to the second terminal 62 of the corresponding cross switch 38 (i-th cross switch 38-$i$), and connected at the other end to the first reference potential (ground) via the second switch 134.

The first switch 132 connects between the first resistor 74 and the first reference potential when the corresponding word line 120 has an H level voltage, and disconnects between the first resistor 74 and the first reference potential when the corresponding word line 120 has an L level voltage. For example, the first switch 132 is an nMOSFET, with the source connected to the first resistor 74, the drain connected to the first reference potential, and the gate connected to the corresponding word line 120.

The second switch 134 connects between the second resistor 76 and the first reference potential when the corresponding word line 120 has an H level voltage, and disconnects between the second resistor 76 and the first reference potential when the corresponding word line 120 has an L level voltage. For example, the second switch 134 is an nMOSFET, with the source connected to the second resistor 76, the drain connected to the first reference potential, and the gate connected to the corresponding word line 120.

The storage circuit 42 having such a configuration is capable of storing M weight values set in the corresponding product-sum operation circuit 20 and M inverted values obtained by inverting the positive/negative of each of the M weight values. Subsequently, at the determination timing, the control circuit 22 switches the M values output from the storage circuit 42 so as to be switched from the M weight values to the M inverted values, or switched from the M inverted values to the M weight values.

Furthermore, the storage circuit 42 having such a configuration can include M positive cells corresponding to M weight values and M inverted cells corresponding to M inverted values. In addition, each of the M positive cells and each of the M inverted cells can include a memristor set to a resistance value in accordance with a corresponding weight value or inverted value.

In addition, the product-sum operation circuit 20 may further include an input inverting circuit that inverts the value of the input signal given to each of the M cross switches 38 under the control of the control circuit 22. Such an input inverting circuit can switch between M input values and M inverted input values obtained by inverting the positive/negative of each of the M input values. In this case, the storage circuit 42 may store M weight values and does not have to store M inverted values.

By inverting the value of the input signal by the input inverting circuit, each of the M cross switches 38 will be switched from the straight connection state to the reverse connection state, or from the reverse connection state to the straight connection state. Therefore, by inverting the value of the input signal given to each of the M cross switches 38, the product-sum operation circuit 20 can invert the positive/negative of the product-sum operation value.

When the layer circuit 12 of the neural network device 10 includes N product-sum operation circuits 20, M common input signals are given to the N product-sum operation circuits 20. Therefore, in this case, the input inverting circuit may be provided to be shared with the N product-sum operation circuits 20 included in the layer circuit 12.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic device comprising:
   N product-sum operation circuits that each receive inputting of M common input signals, that are each set with M weight values, and that each output an intermediate signal obtained by binarizing a product-sum operation value calculated by product-sum operation of M input values and the M weight values, M being an integer of 2 or more and N being an integer of 2 or more, the M input values being represented by the M input signals;

a control circuit that inverts, with respect to the N product-sum operation circuits, positive/negative of each of the M input values or positive/negative of each of the M weight values set to each of the N product-sum operation circuits, at a determination timing being a timing when a given time elapses from an input timing at which the M input values have been input to the each of the N product-sum operation circuits; and an output circuit that outputs an output signal representing a winner product-sum operation circuit for which the product-sum operation value having a given sign and a largest absolute value is calculated among the N product-sum operation circuits, based on a delay time from the determination timing to finalization of a logic of the intermediate signal of each of the N product-sum operation circuits.

2. The arithmetic device according to claim 1, wherein
at least either one of the M input values and the M weight values includes positive/negative signs, and
the control circuit inverts, for the either one of the M input signals and the M weight values, the positive/negative of M values for the one including the positive/negative signs.

3. The arithmetic device according to claim 1, wherein
the output circuit outputs an output signal representing the winner product-sum operation circuit based on an inversion delay time from the determination timing to the inversion of the logic of the intermediate signal of each of the N product-sum operation circuits, and
each of the N product-sum operation circuits outputs the intermediate signal in a manner that the larger the absolute value of the product-sum operation value, the shorter the propagation delay time from the start of the product-sum operation until the inversion of the logic.

4. The arithmetic device according to claim 3, wherein
the output circuit determines, as the winner product-sum operation circuit, the product-sum operation circuit that outputs the intermediate signal for which a sign of the product-sum operation value is a given sign and the inversion delay time is shortest among the N product-sum operation circuits.

5. The arithmetic device according to claim 3, wherein
the control circuit
repeatedly sets the determination timing a plurality of times at given intervals after a timing at which a given time elapses from the input timing, and
inverts, at each of determination timings,
the positive/negative of each of the M input values, or
the positive/negative of each of the M weight values set in each of the N product-sum operation circuits, and
the output circuit
detects the inversion delay time from each of the determination timings correspondingly to each of the N product-sum operation circuits, and
determines the winner product-sum operation circuit based on a plurality of inversion delay times detected for each of the N product-sum operation circuits.

6. The arithmetic device according to claim 5, wherein
the output circuit determines the product-sum operation circuit for which the sign of the product-sum operation value is a given sign and an average value of the plurality of inversion delay times is smallest among the N product-sum operation circuits, as the winner product-sum operation circuit.

7. The arithmetic device according to claim 2, wherein
the output circuit outputs an output signal representing the winner product-sum operation circuit based on an inversion delay time from the determination timing to the inversion of the logic of the intermediate signal of each of the N product-sum operation circuits, and
each of the N product-sum operation circuits outputs the intermediate signal in a manner that the larger the absolute value of the product-sum operation value, the shorter the propagation delay time from the start of the product-sum operation until the inversion of the logic.

8. The arithmetic device according to claim 1, wherein
each of the N product-sum operation circuits comprises:
a positive-side circuit that generates a positive-side signal representing an absolute value of a sum of values of a positive multiplication value group among M multiplication values generated by multiplying each of the M weight values by a corresponding input value out of the M input values;
a negative-side circuit that generates a negative-side signal representing an absolute value of a sum of values of a negative multiplication value group among the M multiplication values; and
a comparator circuit that compares magnitude between the positive-side signal and the negative-side signal and outputs a result of the comparison as the intermediate signal.

9. The arithmetic device according to claim 2, wherein
each of the N product-sum operation circuits comprises:
a positive-side circuit that generates a positive-side signal representing an absolute value of a sum of values of a positive multiplication value group among M multiplication values generated by multiplying each of the M weight values by a corresponding input value out of the M input values;
a negative-side circuit that generates a negative-side signal representing an absolute value of a sum of values of a negative multiplication value group among the M multiplication values; and
a comparator circuit that compares magnitude between the positive-side signal and the negative-side signal and outputs a result of the comparison as the intermediate signal.

10. The arithmetic device according to claim 1, wherein
each of the M input values includes a positive/negative sign,
the arithmetic device further comprises an input inverting circuit that switches between the M input values and M inverted input values obtained by inverting positive/negative of each of the M input values, for each of the N product-sum operation circuits, and
the control circuit controls, at the determination timing, the input inverting circuit to switch the M values to be supplied to the N product-sum operation circuits from the M input values to the M inverted input values, or from the M inverted input values to the M input values.

11. The arithmetic device according to claim 2, wherein
each of the M input values includes a positive/negative sign,
the arithmetic device further comprises an input inverting circuit that switches between the M input values and M inverted input values obtained by inverting positive/negative of each of the M input values, for each of the N product-sum operation circuits, and the control circuit controls, at the determination timing, the input inverting circuit to switch the M values to be supplied to the N product-sum operation circuits from the M input values to the M inverted input values, or from the M inverted input values to the M input values.

12. The arithmetic device according to claim 1, wherein each of the M weight values includes a positive/negative sign, the arithmetic device further comprises a storage circuit that stores the set M weight values, for each of the N product-sum operation circuits, the storage circuit stores the M weight values set in a corresponding product-sum operation circuit and M inverted values obtained by inverting the positive/negative of each of the M weight values, and the control circuit performs control, at the determination timing, to switch the M values to be output from the storage circuit from the M weight values to the M inverted values, or from the M inverted values to the M weight values.

13. The arithmetic device according to claim 2, wherein each of the M weight values includes a positive/negative sign, the arithmetic device further comprises a storage circuit that stores the set M weight values, for each of the N product-sum operation circuits, the storage circuit stores the M weight values set in a corresponding product-sum operation circuit and M inverted values obtained by inverting the positive/negative of each of the M weight values, and the control circuit performs control, at the determination timing, to switch the M values to be output from the storage circuit from the M weight values to the M inverted values, or from the M inverted values to the M weight values.

14. The arithmetic device according to claim 12, wherein the storage circuit comprises M positive cells corresponding to the M weight values and M inverted cells corresponding to the M inverted values, and each of the M positive cells and each of the M inverted cells has a memristor set to a resistance value corresponding to a corresponding weight value or an inverted value.

15. The arithmetic device according to claim 2, wherein each of the N product-sum operation circuits
starts a product-sum operation individually from the input timing and from the determination timing, and
outputs the intermediate signal for which a propagation delay time from the start of the product-sum operation until the finalization of the logic corresponds to the absolute value of the product-sum operation value.

16. An arithmetic method using N product-sum operation circuits that each receive inputting of M common input signals, that are each set with M weight values, and that each output an intermediate signal obtained by binarizing a product-sum operation value calculated by product-sum operation of M input values and the M weight values, M being an integer of 2 or more and N being an integer of 2 or more, the M input values being represented by the M input signals, the method comprising:

with respect to the N product-sum operation circuits, inverting positive/negative of each of the M input values or positive/negative of each of the M weight values set to each of the N product-sum operation circuits, at a determination timing being a timing when a given time elapses from an input timing at which the M input values have been input to the each of the N product-sum operation circuits; and outputting an output signal representing a winner product-sum operation circuit for which the product-sum operation value having a given sign and a largest absolute value is calculated among the N product-sum operation circuits, based on a delay time from the determination timing to finalization of a logic of the intermediate signal of each of the N product-sum operation circuits.

17. A neural network device comprising:
a plurality of layer circuits configured to execute arithmetic operations corresponding to a plurality of layers included in a neural network,
wherein each of the plurality of layer circuits comprises:
N product-sum operation circuits that each receive inputting of M common input signals, that are each set with M weight values, and that each output an intermediate signal obtained by binarizing a product-sum operation value calculated by product-sum operation of M input values and the M weight values, M being an integer of 2 or more and N being an integer of 2 or more, the M input values being represented by the M input signals,
a control circuit that inverts, with respect to the N product-sum operation circuits, positive/negative of each of the M input values or positive/negative of each of the M weight values set to each of the N product-sum operation circuits, at a determination timing being a timing when a given time elapses from an input timing at which the M input values have been input to the each of the N product-sum operation circuits; and
an output circuit that outputs an output signal representing a winner product-sum operation circuit for which the product-sum operation value having a given sign and a largest absolute value is calculated among the N product-sum operation circuits, based on a delay time from the determination timing to finalization of a logic of the intermediate signal of each of the N product-sum operation circuits,
wherein each of the N product-sum operation circuits
starts a product-sum operation individually from the input timing and from the determination timing, and
outputs the intermediate signal for which a propagation delay time from the start of the product-sum operation until the finalization of the logic corresponds to the absolute value of the product-sum operation value.

18. The arithmetic device according to claim 1, wherein each of the N product-sum operation circuits
starts a product-sum operation individually from the input timing and from the determination timing, and
outputs the intermediate signal for which a propagation delay time from the start of the product-sum operation until the finalization of the logic corresponds to the absolute value of the product-sum operation value.

* * * * *